United States Patent [19]
Lizell et al.

[11] Patent Number: 5,363,945
[45] Date of Patent: Nov. 15, 1994

[54] CONTROL VALVE FOR SHOCK ABSORBERS

[75] Inventors: Magnus B. Lizell, Stockholm, Sweden; Bert Vanroye, Borgloon,

[73] Assignee: Monroe Auto Equipment Company, Monroe, Mich.

[21] Appl. No.: 59,465

[22] Filed: May 7, 1993

Related U.S. Application Data

[60] Division of Ser. No. 550,160, Jul. 9, 1990, Pat. No. 5,211,268, which is a continuation of Ser. No. 322,542, Mar. 13, 1989, Pat. No. 4,955,460, which is a continuation-in-part of Ser. No. 227,113, Aug. 1, 1988, abandoned.

[51] Int. Cl.$^5$ .................................. F16F 9/50
[52] U.S. Cl. .................... 188/281; 188/322.17; 188/315
[58] Field of Search ............ 188/322.16, 322.17, 188/313, 314, 315, 318, 319, 299, 281; 280/709, 714

[56] References Cited

U.S. PATENT DOCUMENTS

| | | |
|---|---|---|
| 294,216 | 2/1884 | Fletcher . |
| 2,717,058 | 9/1955 | Brundrett . |
| 3,039,566 | 6/1962 | Rumsey . |
| 3,110,322 | 11/1963 | Bozoyan . |
| 3,124,368 | 3/1964 | Corley et al. . |
| 3,371,751 | 3/1968 | Dickinson . |
| 3,371,752 | 3/1968 | Dickinson ................ 188/315 |
| 3,757,910 | 9/1973 | Palmer . |
| 3,807,678 | 4/1974 | Karnopp et al. . |
| 4,031,989 | 6/1977 | Blazquez . |
| 4,113,072 | 9/1978 | Palmer . |
| 4,189,033 | 2/1980 | Katsumori . |
| 4,325,468 | 4/1982 | Siorek . |
| 4,333,668 | 6/1982 | Hendrickson et al. . |
| 4,428,566 | 1/1984 | de Bann et al. . |
| 4,438,834 | 3/1984 | Handke et al. . |
| 4,468,050 | 8/1984 | Woods et al. . |
| 4,469,315 | 9/1984 | Nicholls et al. . |
| 4,482,036 | 11/1984 | Wossner et al. . |
| 4,494,632 | 1/1985 | de Baan et al. ............ 188/322.17 X |
| 4,576,258 | 3/1986 | Spisak et al. . |
| 4,660,688 | 4/1987 | Spisak et al. . |
| 4,671,392 | 6/1987 | Wossner . |
| 4,749,070 | 6/1988 | Moser et al. . |
| 4,971,180 | 11/1990 | Kobayashi et al. ............ 188/315 X |
| 4,995,460 | 9/1990 | Lizell et al. . |
| 5,211,268 | 5/1993 | Lizell et al. . |

FOREIGN PATENT DOCUMENTS

| | | | |
|---|---|---|---|
| 121930 | 8/1946 | Australia . | |
| 0166313 | 1/1986 | European Pat. Off. . | |
| 3436490 | 5/1986 | Germany | 188/322.17 |
| 3219134 | 9/1991 | Japan | 188/322.17 |
| 1450441 | 9/1976 | United Kingdom . | |
| 1450765 | 9/1976 | United Kingdom . | |
| 2115903 | 9/1983 | United Kingdom . | |

Primary Examiner—Robert J. Oberleitner
Assistant Examiner—Lee W. Young
Attorney, Agent, or Firm—Harness, Dickey & Pierce

[57] ABSTRACT

A direct acting shock absorber for damping the movement of the body of an automobile is disclosed. The shock absorber comprises a pressure cylinder forming a working chamber having first and second portions operable to store damping fluid. A piston is disposed within the pressure cylinder between the first and second portions of the working chamber. The shock absorber further comprises a fluid reservoir operable to store damping fluid. The shock absorber also includes a valve for permitting damping fluid to flow from the first portion of the working chamber to the fluid reservoir during movement of the piston in a first direction. Finally, a second valve is provided for permitting damping fluid to flow from the fluid reservoir to the second portion of the working chamber during movement of the piston in a second direction.

18 Claims, 9 Drawing Sheets

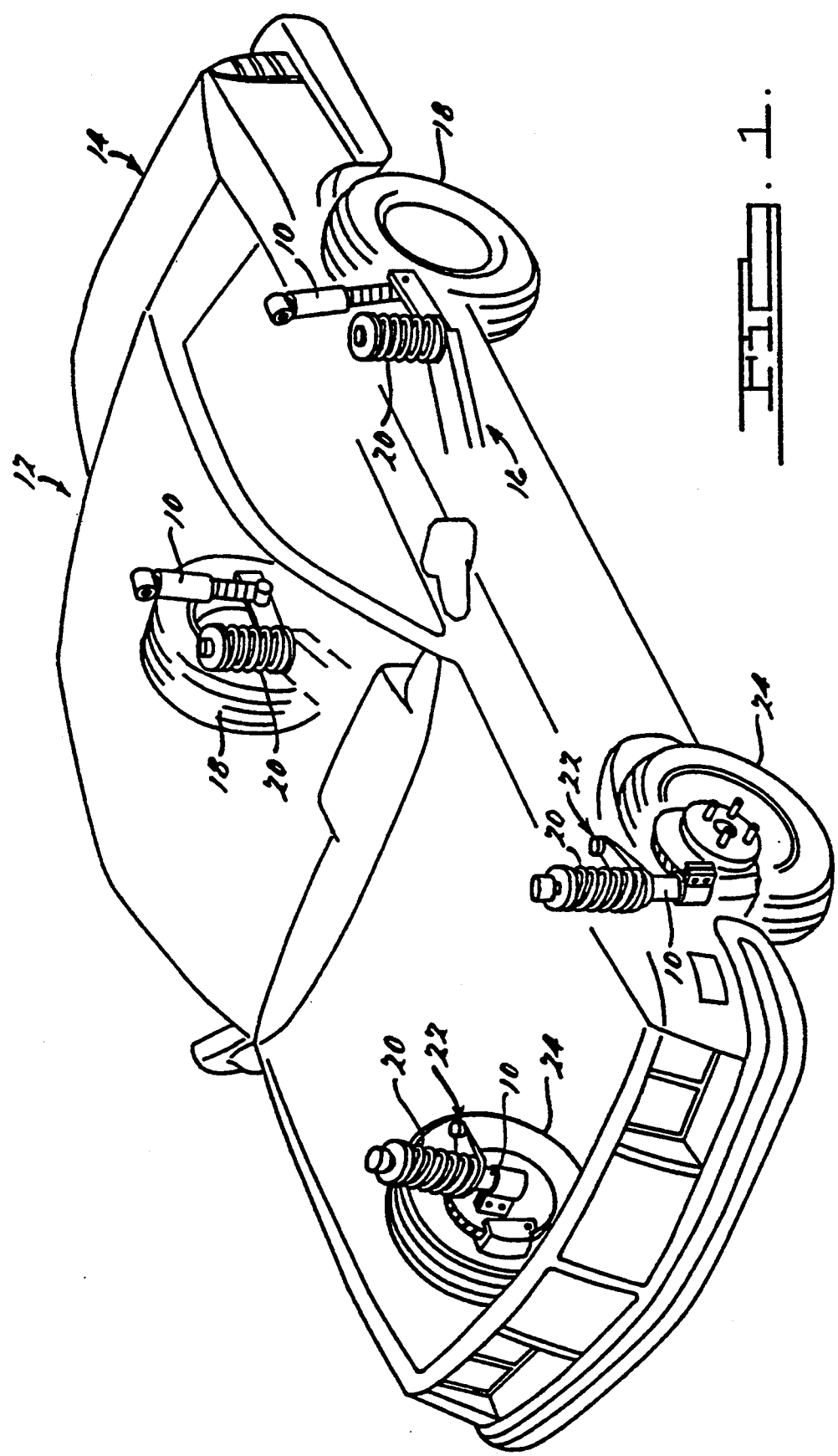

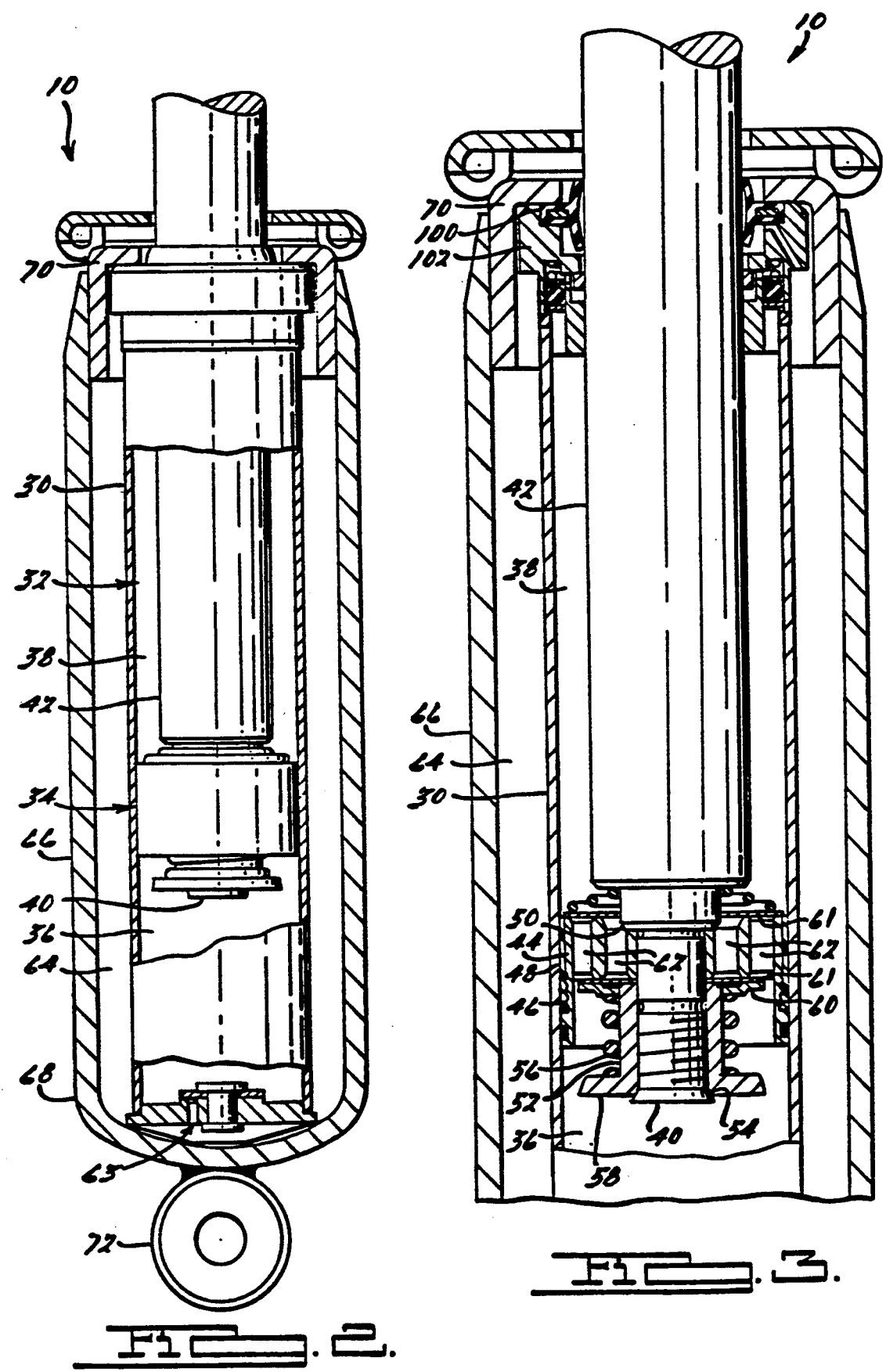

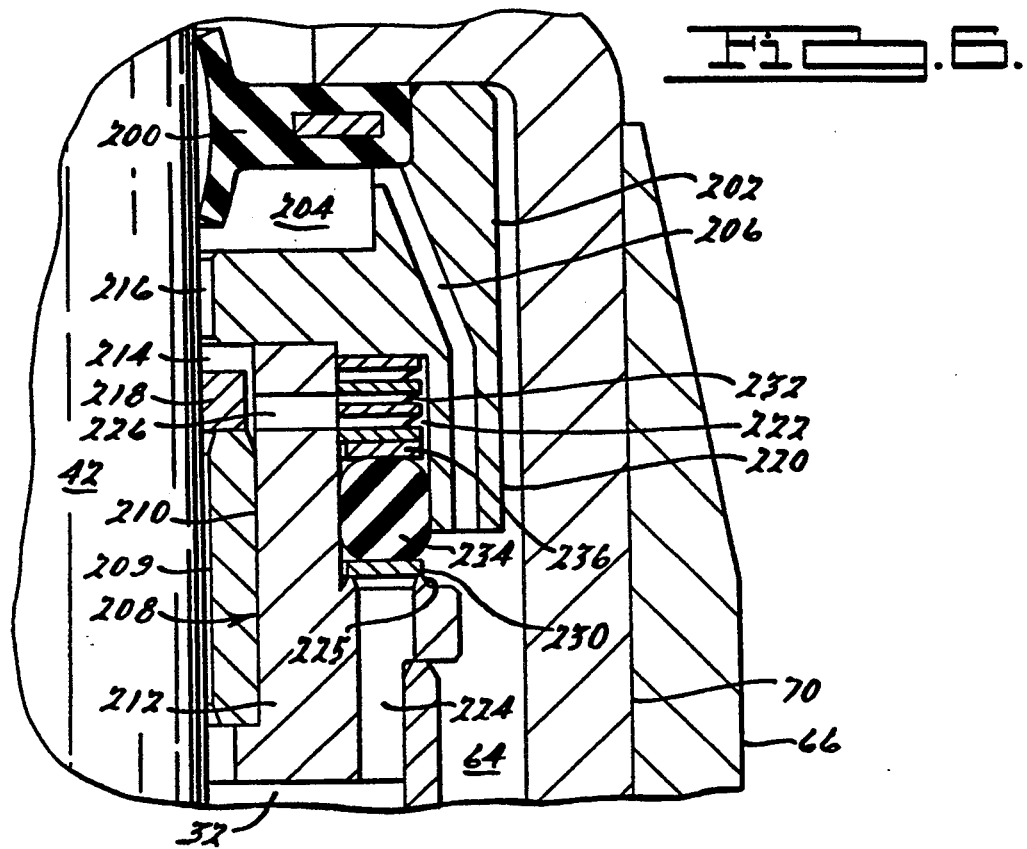
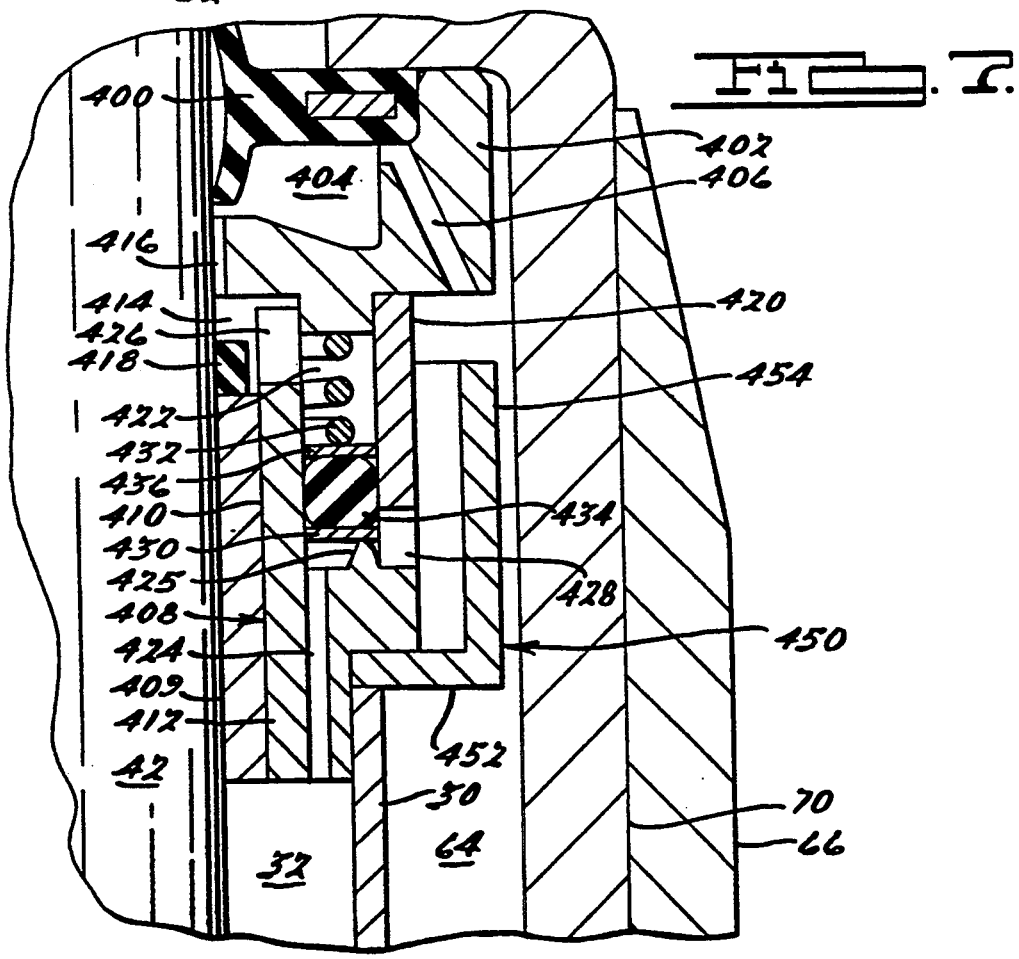

CONTROL VALVE FOR SHOCK ABSORBERS

CROSS-REFERENCE TO RELATED APPLICATION

This is a divisional of U.S. Ser. No. 07/550,160 filed Jul. 9, 1990, now U.S. Pat. No. 5,211,268, which is a continuation of 07/322,542 filed Mar. 13, 1989, now U.S. Pat. No. 4,955,460, which is a continuation of 07/227,113 filed Aug. 1, 1988, now abandoned.

BACKGROUND OF THE INVENTION

1. Field of the Invention

This invention relates to vehicle suspension systems, and more particularly to a valve for controlling the internal fluid displacement in a shock absorber.

2. Description of the Related Art

Shock absorbers are used in connection with automobile suspension systems and other vehicle suspension systems to absorb unwanted vibrations which occur during locomotion. To absorb this unwanted vibration, shock absorbers are generally connected between the body and the suspension of the automobile. A piston is located within the shock absorber and is connected to the vehicle body through a piston rod. Because the piston is available to limit the flow of damping fluid within the working chamber of the shock absorber when the shock absorber is compressed or extended, the shock absorber is able to produce a damping force which counteracts the vibration which would otherwise be transmitted from the suspension of the automobile to the body.

A conventional shock absorber comprises a pressure tube with a piston therein and a reserve tube surrounding the pressure tube. A piston rod connected to the piston projects from one end of the pressure tube. At the other end of the pressure tube is a valve communicating with the reserve tube. Damping is controlled by orifices in the piston which regulate passage of fluid from one side of the piston to the other. Due to the presence of a piston rod on only one side of the piston, different volumes of hydraulic fluid must be displaced on the compression and rebound strokes. This difference is the rod volume.

The rod volume of hydraulic fluid is pushed out of the pressure tube during the compression stroke through the valve in the base of the shock absorber. The hydraulic fluid is then stored in the reserve tube which surrounds the pressure tube of the shock absorber.

During the rebound stroke, this fluid which was displaced into the reserve tube through the base valve reenters the pressure tube via the same valve. As the piston moves back and forth within the pressure tube, the rod volume of oil is correspondingly pushed into and out of the reserve tube through the base valve. Thus only a portion of the fluid in the reserve tube is effectively utilized. The remainder remains relatively static within the reserve tube. This quick exchange of fluid as well as the friction between the piston and tube wall generates heat which is very undesirable during prolonged operating conditions. Because of the cyclic fluid exchange through the base valve, the generated heat is concentrated near the base of the pressure tube. The generation of this heat decreases the viscosity of the hydraulic fluid and decreases the lifetime of the operability of the shock absorber.

In addition, because conventional shock absorbers use a base valve, the damping forces generated during compression could not be completely controlled by the amount of damping fluid flowing through the piston. Because the damping forces could not be completely controlled by the amount of damping fluid flowing through the piston, the range of damping which adjustable damping suspension systems could provide was often somewhat limited.

SUMMARY OF THE INVENTION

Accordingly, it is a primary object of the present invention to provide a shock absorber in which the amount of damping forces generated during compression is independent of the operation of the base valve.

Another object of the present invention is to provide a shock absorber that circulates the rod volume of hydraulic fluid into the reserve tube so as to provide an increased heat sink capability of the shock absorber.

A further object of the present invention is to provide a shock absorber having improved operational life due to operation at lower working fluid temperatures.

A shock absorber according to the present invention, has a control valve arranged at the upper end of the pressure tube in addition to the base valve at the bottom of the pressure tube. According to the principal of the present invention, during the compression stroke of the shock absorber piston, the rod volume of hydraulic fluid is discharged out of the pressure tube through the valve at the upper end of the pressure tube and into the outer reserve tube. During rebound, or extension, the rod volume of hydraulic fluid is replaced from the bottom of the reserve tube through the base valve into the lower portion of the pressure tube. In the present invention, therefore, hydraulic fluid that is pushed out of the pressure tube into the reserve tube enters the reserve tube at the top. This hydraulic fluid must then travel the entire length of the reserve tube prior to returning into the pressure tube via the base valve.

Thus the present invention sets up a single flow path and direction into and out of the reserve tube. Entering fluid must travel the length of the reserve tube prior to returning to the pressure tube. This prolongs the period of time in which a given body of oil resides in the reserve tube, thus greatly enhancing the heat dissipation capability of the shock absorber. Consequently, the shock absorber operates at a lower temperature which in turn prolongs shock absorber life.

BRIEF DESCRIPTION OF THE DRAWINGS

Various advantages of the present invention will become apparent to one skilled in the art upon reading the following detailed description and by reference to the following drawings in which:

FIG. 1 is a schematic representation of the shock absorbers, according to the present invention, in operative association with a typical automobile;

FIG. 2 is a side elevational view, partially broken away of one of the shock absorbers according to the present invention shown in FIG. 1;

FIG. 3 is an enlarged side elevational view of the upper portion of the shock absorber shown in FIG. 2, with portions partially broken away showing the valve arrangement of one preferred embodiment of the present invention;

FIG. 6 is an enlarged view of a third alternative preferred embodiment of the invention shown in FIG. 3 having a raised valve seat and a plastic bushing between the rod guide and the rod;

FIG. 7 is a fourth alternative preferred embodiment of the present invention;

DETAILED DESCRIPTION OF THE PREFERRED EMBODIMENTS

Figure 4:
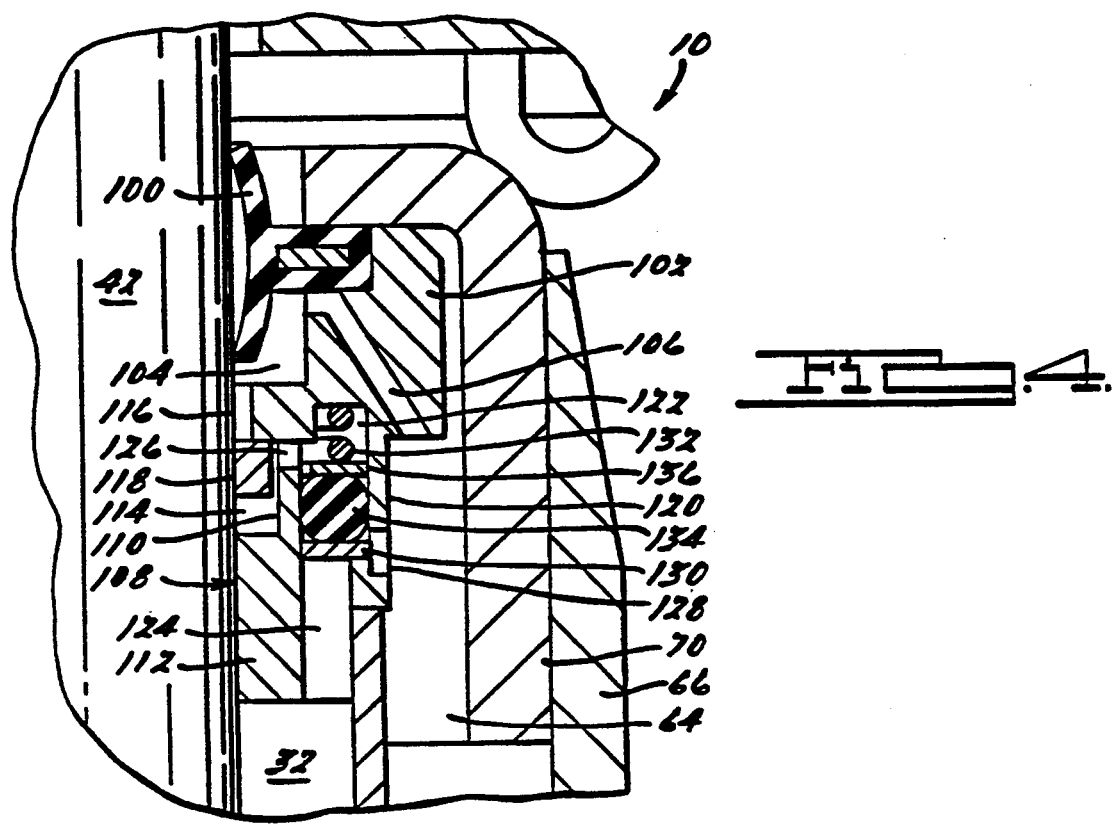
FIG. 4 is an enlarged view of a portion of FIG. 3.

Referring to FIG. 1, a plurality of four shock absorbers 10 according to a preferred embodiment of the present invention are shown. The shock absorbers 10 are depicted in operative association with a diagrammatic representation of a conventional automobile 12 having a vehicle body 14. The automobile 12 includes a rear suspension system 16 having a transversely extending rear axle assembly (not shown) adapted to operatively support the vehicle's rear wheels 18. The rear axle assembly is operatively connected to the automobile 12 by a pair of shock absorbers 10 and a pair of helical coil springs 20. Similarly, the automobile 12 has a front suspension system 22 including a transversely extending front axle assembly (not shown) to operatively support the vehicle's front wheels 24. The front axle assembly is operatively connected to the vehicle body 14 by means of a second pair of shock absorbers 10 and by another pair of helical coil springs 20. The shock absorbers 10 serve to damp the relative movement of the unsprung portion (i.e., the front and rear suspension systems 22 and 16) and the sprung portion (i.e., the body 14) of the automobile 12. While the automobile 12 has been depicted as a passenger car, the shock absorber 10 may be used with other types of vehicles or in other types of vibration damping applications. Further, the term "shock absorber" as used herein will refer to shock absorbers in the general sense of the phrase and will include MacPherson struts.

With particular reference now to FIG. 2, the shock absorber 10 according to the present invention is shown. The shock absorber 10 comprises an elongated pressure tube cylinder 30 defining a damping fluid containing working chamber 32. A slidably movable piston 34 divides chamber 32 into and defines a lower first portion 36 and an upper second portion 38. The reciprocal piston 34 is secured to one end of an axially extending piston post 40 which is in turn secured to an axially extending piston rod 42 which passes axially through upper portion 38.

The piston 34 comprises a housing 44, shown in FIG. 3, having a plurality of ridges 46 disposed on the annular exterior of the piston housing 44. The ridges 46 are used to secure an annular teflon sleeve 48 which is disposed between the ridges 46 of the piston housing 44 and the pressure cylinder tube 30. The teflon sleeve 48 permits movement of the piston 34 with respect to the cylinder 30 without generating undue frictional forces.

Upward movement of the piston 34 is limited by a radially extending step portion 50 of the piston post 40. Downward movement of the piston 34 is limited by a threaded nut 52 or similar type fastening element which is threadably received upon the lower portion 54 of the piston post 40. A helical coil spring 56 is arranged concentrically of the nut 52 and is supported at the lower end thereof by a radially outwardly extending flange 58 on the lower end of the nut 52. The upper end of the spring 56 bears against a spring retainer 60 which in turn acts against a valve disk 61 and the underside of the housing 44 to thereby resiliently urge the piston upward. The piston 34 including valve disks 61 provides a means for controlling the flow of damping fluid between the first and second portions 36 and 38 of the working chamber 32 through a plurality of orifices 62 in piston housing 44.

It is to be understood that the piston 34 is described in general terms as the present invention may be used with a wide variety of piston designs. One such piston is disclosed in U.S. Pat. No. 4,113,072, which is hereby incorporated by reference.

The shock absorber 10 further comprises a base valve 63 located within the lower end of the pressure cylinder 30 which is used to permit the flow of damping fluid into the working chamber 32 from an annular fluid reservoir 64 during rebound. The annular fluid reservoir 64 is defined as the space between the outer periphery of the cylinder 30 and the inner periphery of a reservoir tube or cylinder 66 which is arranged preferably concentrically around the exterior of the pressure cylinder 30. The base valve 63 may be designed so that damping fluid is unable to flow through the base valve 63 during compression. If the base valve 63 is designed in this manner, the damping forces generated during compression will be substantially fully controlled by the amount of damping fluid flowing through the piston 34. Accordingly, the range of damping which may be generated by the shock absorber 10 may be somewhat larger than otherwise possible if the shock absorber 10 is part of an adjustable damping suspension system.

The lower end of the shock absorber 10 is provided with a cup-shaped lower end cap 68 closing the lower end of the reservoir tube 66. The upper end of the shock absorber 10 includes a generally cup-shaped end cap 70 having an aperture therethrough for passage of piston rod 42. The upper portion (not shown) of the piston rod 42 is attached to the vehicle body 14 in a conventional manner. A suitable end fitting 72 is secured to the lower end of the lower end cap 68 for operatively securing the shock absorber 10 to the axle assembly of the automobile 12 also in a conventional manner.

Referring now to FIG. 3 and to the enlarged upper portion of the shock absorber 10 shown in FIG. 4, a control valve arrangement according to a first preferred embodiment of the present invention is shown. Inside the upper end cap 70 at the upper end of pressure tube 30 is a rubber or plastic annular seal 100. The seal 100 is adjacent to the periphery of the piston rod 42 and is used to prevent dirt and foreign matter from entering the working interior of the shock absorber 10. The seal 100 is retained in position by a seal retainer 102 and the end cap 70 and forms one boundary of a first annular cavity 104 between the seal retainer 102, the piston rod 42 and the seal 100. Between annular cavity 104 and reservoir 64 is a flow passage 106. The flow passage 106 allows damping fluid to flow through the seal retainer 102 between the cavity 104 and the reservoir 64. The operation of the flow passage 106 will be more fully described below.

An annular rod guide 108 having an upper section 110 and a lower section 112 is positioned adjacent to the periphery of the piston rod 42 below the seal retainer 102. The upper section 110 of the annular rod guide 108 abuts the seal retainer 102, while the lower section 112 of the annular rod guide 108 is fitted within the pressure tube 30. The annular rod guide 108 provides radial support to the piston rod 42 while allowing axial movement of the piston rod 42 within the pressure tube cylinder 30.

The upper section 110 of the annular rod guide 108 has an inside diameter greater than the inside diameter of the lower section 112 of the annular rod guide 108 thereby forming a second annular cavity 114 between the piston rod 42, the upper section 110 of annular rod guide 108 and the seal retainer 102. A second axially extending flow passage 116 is formed between the seal retainer 102 and the piston rod 42 which allows fluid communication between the cavity 104 and the cavity 114.

Positioned within the annular cavity 114 and adjacent to the periphery of the piston rod 42 is a frictional slip ring 118. The slip ring 118 moves between contact with the seal retainer 102 when the piston rod 42 moves in an upward direction, and contact with the annular rod guide 108 when the piston rod 42 moves in a downward direction. As the piston rod 42 continues upward or downward travel, the slip ring 118 slides along the surface of the annular piston rod 42 so that the slip ring 118 remains in contact with either seal retainer 102 or rod guide 108, respectively.

As can be seen in FIG. 4, when the annular piston rod 42 moves in an upward direction, the slip ring 118 moves into contact with the seal retainer 102 thereby preventing the flow of damping fluid through the flow passage 116. Because the slip ring 118 is able to slide along the surface of the annular piston rod 42, further upward movement of the piston rod 42 continues to maintain slip ring 118 in sealing engagement with seal retainer 102. When the piston rod 42 is moved in a downward direction, the slip ring 118 is displaced from the seal retainer 102 thereby allowing damping fluid to flow through the flow passage 116 from the first cavity 104 through the seal retainer 102 to the second cavity 114.

The shock absorber 10 further comprises a cylindrical sleeve 120 which is positioned concentric to and radially spaced outwardly from the upper section 110 of the rod guide 108. The sleeve 120 is secured between the seal retainer 102 and the lower section 112 of the rod guide 108 to form a third annular cavity 122. The shock absorber further comprises an axially aligned third flow passage 124 through lower section 112 of the rod guide 108. The third flow passage 124 fluidly communicates between the upper portion 36 of working chamber 32 and the third annular cavity 122. A first orifice 126 disposed on the upper section 110 of the rod guide 108 allows fluid communication between the second cavity 114 and the third cavity 122. A second orifice 128 disposed on the sleeve 120 allows fluid communication between the third cavity 122 and the reservoir 64.

To control the flow of damping fluid through the flow passage 124, an annular valve disk 130 is provided. The annular valve disk 130 is radially displaced from the piston rod 42 between the annular rod guide 108 and the cylindrical sleeve 120. The disk 130 is biased in a downward direction against the lower section 112 of the annular rod guide by a helical spring 132. The helical spring 132 is disposed in the third cavity 122 and provides sufficient biasing force against the valve disk 130 so as to prevent the flow of damping fluid through the third flow passage 124 until such flow is desired.

An O-ring or similar sealing element 134 disposed above disk 130 within the cavity 122 transmits the force from the spring 132 to the annular valve disk 130 to valve disk 130 against the flow passage 124. In addition, the O-ring 134 provides a seal between the upper section 110 of the annular rod guide 108 and the cylindrical sleeve 120. Disposed between the helical spring 132 and the O-ring 134 is a retaining disk 136. The retaining disk 136 is used to distribute the downwardly directed spring force from the spring 132 evenly around the O-ring 134.

During the compression stroke of the shock absorber 10, the slip ring 118 moves downward with the piston rod 42 in a direction away from the seal retainer 102 thereby opening the second passage 116. Travel of frictional slip ring 118 is terminated when the slip ring 118 contacts the annular rod guide 108. As piston rod 42 continues to move downward during compression, the slip ring 118 remains stationary against the lower section 112 of the annular rod guide 108. When the piston rod 42 moves upward during rebound, the slip ring 118 frictionally rides upward on the piston rod 42 until the slip ring 118 contacts the retainer 102. The slip ring 118 then remains stationary against the retainer 102 during further upward motion of the annular rod guide 108 thereby preventing the flow of damping fluid through the flow passage 116.

During downward travel of the piston rod 42, there is a higher pressure within the working chamber 32 than in the reservoir 64. This pressure is transmitted through the flow passage 124 to the underside of the valve disk 130. Accordingly, the force acting on the upper side of the O-ring 134 includes the force due to the pressure of the hydraulic fluid in the reservoir 64 in addition to the force exerted by the spring 132 which is transmitted through the retaining disk 136. As shown in FIG. 4, hydraulic fluid in the reservoir 64 is in fluid communication with the reservoir 64 through the first passage 106 and the first annular cavity 104, through second flow passage 116 to the second cavity 114, through the first orifice 126 to the third cavity 122 and the O-ring 134. Accordingly, the pressure differential across the O-ring 134 permits the valve disk 130 to raise, thereby allowing hydraulic fluid to pass from the chamber 32 through the passage 124 into the cavity 122, through the second orifice 128 in the sleeve 120 and into the reservoir 64. The base valve 63 is closed during the compression stroke so that the hydraulic fluid beneath the piston 34 is able to flow through the piston orifices 62 from portion 36 to portion 38 as piston rod 42 is moved downward in compression.

During the rebound stroke, the piston rod 42 is moved in an upward direction. The upward movement carries the slip ring 118 into contact with seal retainer 102, thus closing the second flow passage 116. When the second flow passage is closed in this manner, the flow path of hydraulic fluid between the reservoir 64 and the upper side of the O-ring 134 is isolated. Accordingly, the fluid pressure above the O-ring 134 in the third cavity 122 is at the same pressure as the hydraulic fluid in the working chamber 32 beneath rod guide 108. Due to the fact that the area above the O-ring 134 is greater than the area beneath the valve disk 130, and due to the spring force exerted by helical spring 132 against the retaining disk 136, annular valve disk 130 maintains passage 124 closed thus, closing off the orifice 128. Accordingly, the hydraulic fluid above the piston 34 in the upper portion 38 of chamber 32 is forced through the orifices 62 in the piston 34 thereby causing the desired rebound force. The volume of hydraulic fluid required to fill the lower portion 36 of the working chamber 32 as the piston rod 42 moves upward flows from the reservoir 64 into the lower chamber portion 36 through the base valve 63.

Accordingly, during the compression stroke, excess hydraulic fluid is forced out of the upper portion 38 of the chamber 32 into the reservoir 64 via the flow passage 124, past the annular disk 130 and through the orifice 128 into the upper portion of the reservoir 64. During the rebound stroke, hydraulic fluid flows through the base valve 63 into the lower portion 36 of the working chamber 32. In this manner, hydraulic fluid is always cycled in one direction through the reservoir 64, i.e., from top to bottom. This permits enhanced heat transfer from the fluid through the reservoir cylinder 66 to atmosphere to prolong fluid and shock absorber operational life.

Alternative preferred embodiments of the present invention are shown in FIGS. 5 through 8. The following description of these embodiments utilizes like numbers to describe like parts as in the first embodiment where appropriate.

Figure 5:
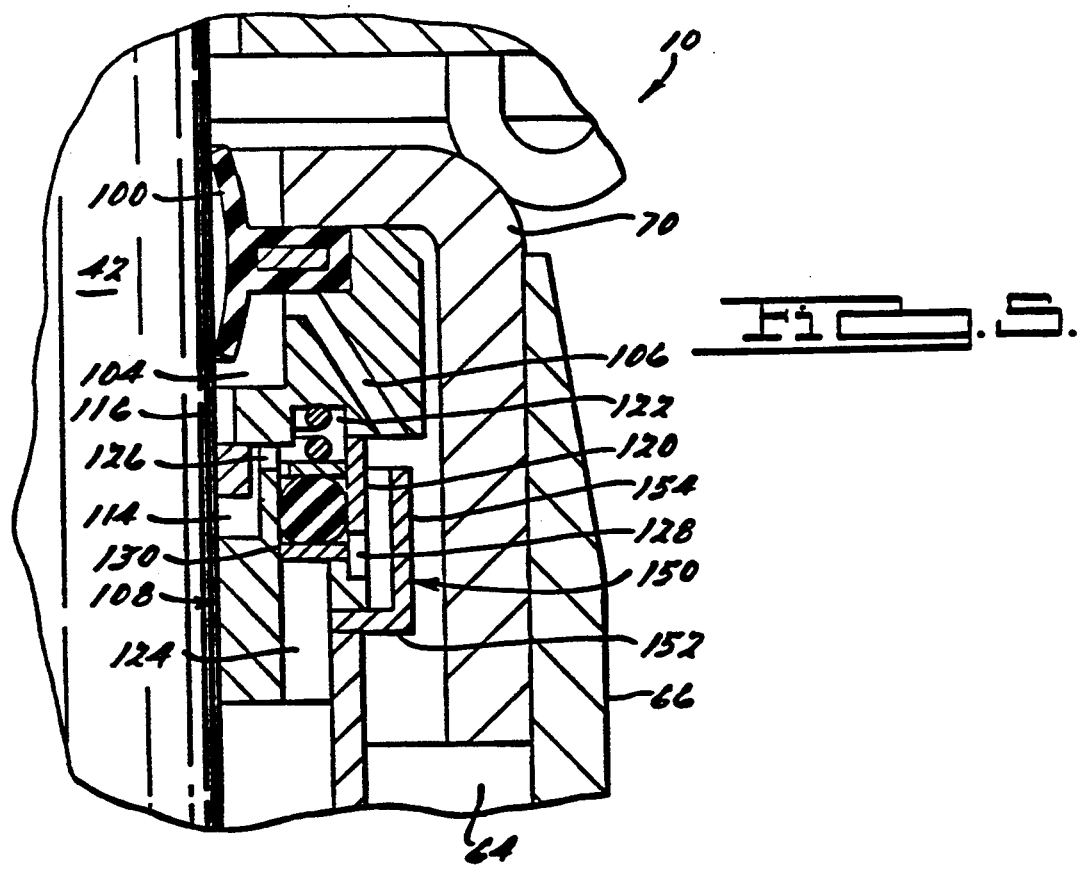
FIG. 5 is an enlarged view of a second preferred embodiment of the invention shown in FIG. 3 having an additional fluid reservoir at the upper end of the pressure tube.

Referring now to FIG. 3 and to the enlarged portion of the shock absorber 10 shown in FIG. 5, a control valve arrangement according to a second preferred embodiment of the present invention is shown. This embodiment is identical to the embodiment shown in FIG. 4 with the addition of an annular cup-shaped reservoir 150 around the rod guide 108 outside and adjacent to the orifice 128. The reservoir 150 prevents the shock absorber 10 from working into freestroke which can happen in certain conditions. For example, freestroke may occur when air in reservoir 64 flows underneath the valve disk 130. However, freestroke may be prevented by having a reservoir 150 of hydraulic fluid adjacent to the orifice 128 so as to preclude the entry of air. The reservoir 150 comprises a radial portion 152 which joins with the rod guide 108 above the end of the pressure tube 30 and an axially extending sleeve portion 154 forming an open cup around the sleeve 120.

During the compression stroke, hydraulic fluid passes through the orifice 128 into the reservoir 150, over the top of the sleeve portion 154 into the reservoir 64. During the rebound stroke, air is prevented from passing through the orifice 128 during any occurrence of freestroke by the quantity of fluid that builds up and remains in the reservoir 150.

Referring now to FIG. 3 and to the enlarged portion of the shock absorber 10 shown in FIG. 6, a control valve arrangement according to a third preferred embodiment of the present invention is shown. At the upper end of the pressure tube 30 and around the piston rod 42, inside upper end cap 70, is a rubber or plastic annular seal 200. The seal 200 prevents dirt and foreign matter from entering the working interior of the shock absorber 10. The seal 200 is retained in position by a seal retainer 202 and end cap 70 and forms one side of a first annular cavity 204 between the seal retainer 202, the piston rod 42 and the seal 200. A flow passage 206 is disposed in the seal retainer 202 between the annular cavity 204 and the reservoir 64.

An annular rod guide 208 having an upper section 210 and a lower section 212 is positioned around the periphery of the piston rod 42 below the seal retainer 202. The upper section 210 of the annular rod guide 208 abuts the seal retainer 202, while the lower section 212 of the rod guide 208 is fitted within the pressure tube 30. The rod guide 208 provides radial support to the piston rod 42 thereby allowing axial movement of piston rod 42 within pressure tube cylinder 30. Positioned between the piston rod 42 and rod guide 208 is a plastic sleeve bushing 209. The sleeve bushing 209 is used to prevent wear of the rod guide 208 and reduces the friction against the piston rod 42.

The upper section 210 of the annular rod guide 208 has an inside diameter greater than the inside diameter of the lower section 212 of the rod guide 208 thereby forming a second annular cavity 214 between the piston rod 42, the busing 209, the upper section 210 of the rod guide 208 and the seal retainer 202. A second passage 216 which is disposed in the seal retainer 202 adjacent to the piston rod 42 communicates between the cavity 204 and the cavity 214.

Positioned within annular cavity 214 and around the piston rod 42 is a frictional slip ring 218. The frictional slip ring 218 moves between contact with the seal retainer 202 when the piston rod 42 moves in an upward direction, and contact with the bushing 209 when the piston rod 42 moves in a downward direction. As the piston rod 42 continues upward or downward travel, the slip ring 218 remains in contact with either the seal retainer 202 or the bushing 209 respectively.

As can be seen in FIG. 6, when the piston rod 42 moves in an upward direction during rebound, the slip ring 218 moves into contact with the seal retainer 202 thereby sealing off the flow passage 216. Further upward movement of the piston rod 42 continues to maintain the slip ring 218 in sealing engagement with the seal retainer 202. When piston rod 42 is moved downward during compression, the slip ring 218 moves away from the seal retainer 202 thus opening the passage 216 from the first cavity 204 through the seal retainer 202 to the second cavity 214.

A cylindrical sleeve portion 220 of the seal retainer 202 extends downward and is positioned concentric to and radially spaced outward from the upper section 210 of the rod guide 208. The sleeve portion 220 is an integral part of the seal retainer 202 and together with the upper section 210 and the lower section 212 of the rod guide 208 forms a third annular cavity 222 in between. An axially aligned third passage 224 through the lower section 212 of the rod guide 208 communicates axially between the upper portion 38 of working chamber 32 and the third annular cavity 222. A first orifice 226 through upper section 210 of rod guide 208 permits fluid communication between the second cavity 214 and the third cavity 222.

An annular valve disk 230 positioned on the periphery of the piston rod 42 and within the third annular cavity 222 is used to prevent the flow of damping fluid through the flow passage 224. The valve disk 230 is biased downward against the lower section 212 of the rod guide 208 to close off the flow passage 224 by a wave washer spring 232 also disposed in third cavity 222. On the upper surface of the lower section 212 of the rod guide 208 is a raised valve seat 225. The raised valve seat 225 is disposed on the periphery of the flow passage 224 and provides positive seating of valve disk 230 to close off passage 224.

An O-ring 234 disposed above the valve disk 230 within the cavity 222 transmits the force from the spring 232 to the annular valve disk 230 so as to bias the valve disk 230 against the valve seat 225. In addition, the O-ring 234 provides a seal between the upper section 220 of the rod guide 208 and the cylindrical sleeve portion 220 of the seal retainer 202. Disposed between the wave washer spring 232 and the O-ring 234 is a retaining disk 236. The retaining disk 236 distributes the downwardly directed spring force from the spring 232 evenly around the O-ring 234.

During the compression stroke of the piston rod 42, the slip ring 218 also moves downward with the piston rod 42 away from the seal retainer 202 thereby opening second passage 216. Travel of the frictional slip ring 218 is terminated when the slip ring 218 contacts the bushing 209 on the rod guide 208. As piston rod 42 continues to move in a downward direction, the slip ring 218 remains stationary. When the piston rod 42 moves in an upward direction, the slip ring 218 frictionally rides upward on the piston rod 42 until contact with the retainer 202 is made. The slip ring 218 then remains stationary against retainer 202 sealing off the passage 216 between the cavity 204 and the cavity 214 during further upward motion of the rod 42.

During downward travel of the piston rod 42, the pressure within the working chamber 32 is higher than the pressure in the reservoir 64. The pressure of the hydraulic fluid in the working chamber 32 is transmitted through the flow passage 224 to the underside of the valve disk 230. The pressure in reservoir 64, in addition to the spring force generated by the wave washer spring 232, is felt on the upper side of the O-ring 234. The pressure of the hydraulic fluid in the reservoir 64 is transmitted through the reservoir 64, the first passage 206, the first annular cavity 204, through the second passage 216 to the second cavity 214, through the first orifice 226 to the third cavity 222 and the O-ring 234. This path allows fluid to flow from the upper side of the O-ring 234 and permits the valve disk 230 to lift, compressing the spring 232, and allowing hydraulic fluid to pass through the passage 224, past the seat 225, and into the reservoir 64.

During the rebound stroke, the movement of the piston rod 42 carries the slip ring 218 upward into contact with the seal retainer 202, thus closing the second flow passage 216. This isolates the path between the reservoir 64 and the upper side of O-ring 234. Therefore, the fluid pressure above the O-ring 234 in the third cavity 222 is at the same pressure as the working chamber 32 beneath the rod guide 208. Due to the fact that the area above the O-ring 234 is greater than the area beneath the annular disk 230 and due also to the spring force provided by wave washer spring 232, the annular valve disk 230 is forced against the valve seat 225 which maintains the flow passage 224 closed. Thus, the hydraulic fluid above the piston 34 in the upper portion 38 of the chamber 32 is forced through the orifices 62 in the piston 34 thereby causing the appropriate rebound force. The hydraulic fluid needed to replace the hydraulic fluid displaced as the piston rod 42 moves upward flows from the reservoir chamber 64 into the lower portion 36 through the base valve 63.

Thus, during the compression stroke, excess hydraulic fluid is forced out of the upper portion 38 of the chamber 32 into the reservoir 64 via the flow passage 224, past the annular valve disk 230 and into the upper portion of the reservoir 64. On the rebound stroke, hydraulic fluid flows through the base valve 63 into the lower portion 36 of the working chamber 32. In this manner, the hydraulic fluid is again always cycled in one direction through the reservoir 64, i.e., from top to bottom. As in the previous embodiments, this one-directional flow of hydraulic fluid permits enhanced heat transfer from the fluid through the reservoir tube 66 to atmosphere to prolong fluid and shock absorber operational life.

Referring now to FIG. 3 and to the enlarged portion of the shock absorber 10 shown in FIG. 7, a control valve arrangement according to a fourth preferred embodiment of the present invention is shown. At the upper end of the pressure tube 30 and adjacent to the periphery of the piston rod 42 is a rubber or plastic annular seal 400. The seal 400 is disposed inside the upper end cap 70 and prevents dirt and foreign matter from entering the working interior of the shock absorber 10.

The seal 400 is retained in position by a seal retainer 402 and an end cap 70 and forms one side of a first annular cavity 404 between a seal retainer 402, the piston rod 42 and the seal 400. To permit fluid communication between the annular cavity 404 and the reservoir 64, a flow passage 406 is provided through seal retainer 402.

An annular rod guide 408 having an upper section 410 and a lower section 412 is positioned adjacent to the periphery of the piston rod 42 below the seal retainer 402. The upper section 410 of the annular rod guide 408 abuts the seal retainer 402, while the lower section 412 of the rod guide 408 is fitted within the pressure tube 30. The rod guide 408 provides radial support to the piston rod 42 thereby allowing axial movement of piston rod 42 within the pressure tube cylinder 30. Disposed between the piston rod 42 and the rod guide 408 is a plastic sleeve bushing 409. The sleeve bushing 409 is used to prevent wear of the rod guide 408 and reduces the friction against the piston rod 42.

The shock absorber 10 also comprises a second annular cavity 414 which is formed between the piston rod 42, the sleeve bushing 409, the upper section 410 of the rod guide 408 and the seal retainer 402. A second passage 416 through the seal retainer 402 adjacent to the piston rod 42 communicates between the cavity 404 and the cavity 414. Positioned within the annular cavity 414 and around the piston rod 42 is a frictional slip ring 418. The frictional slip ring 418 moves between contact with the seal retainer 402 when the piston rod 42 moves in an upward direction, and contact with the sleeve bushing 409 when the piston rod 42 moves in a downward direction. As the piston rod 42 continues upward or downward travel, the slip ring 418 remains in contact with either the seal retainer 402 or the sleeve bushing 409, respectively.

As can be seen in FIG. 7, when the piston rod 42 moves in an upward direction, the slip ring 418 moves into contact with the seal retainer 402 thereby sealing the flow passage 416. Further upward movement of the piston rod 42 continues to maintain the slip ring 418 in sealing engagement with the seal retainer 402. When the piston rod 42 is moved downward, the slip ring 418 moves in a direction away from the seal retainer 402, thus opening the flow passage 416 from the first cavity 404 through the seal retainer 402 to the second cavity 414.

A cylindrical sleeve 420 is positioned concentric to and radially outwardly spaced from the upper section 410 of the rod guide 408. The sleeve 420 is secured between the seal retainer 402 and the lower section 412 of the rod guide 408 to form a third annular cavity 422. An axially aligned third passage 424 through the lower section 412 of the rod guide 408 provides fluid communication between the upper portion 38 of the working chamber 32 and the third annular cavity 422. A first orifice 426 through the upper section 410 of the rod guide 408 communicates radially between the second cavity 414 and the third cavity 422. A second orifice 428 through the sleeve 420 allows fluid communication between the third cavity 422 and the reservoir 64.

The shock absorber 10 further comprises an annular valve disk 430 positioned about the piston rod 42. The valve disk 430 is disposed within the third annular cavity 422 and is used for sealing the passage 424. The valve disk 430 is biased downward against an upwardly extending seat portion 425 of the lower section 412 of the rod guide 408 to close off the passage 424 by the helical spring 432 also residing in the third cavity 422.

An O-ring 434 disposed above the valve disk 430 within the cavity 422 transmits the force from the spring 432 to the annular valve disk 430 to seat the valve disk 430 against the seat portion 425 to close the passage 424 through the rod guide 408. In addition, the O-ring 434 provides a seal between the upper section 410 of rod guide 408 and the cylindrical sleeve 420. Positioned between the helical spring 432 and the O-ring 434 is a retaining disk 436. The retaining disk 436 distributes the downwardly directed spring force from the spring 432 evenly around the O-ring 434.

During the compression stroke of the shock absorber, the slip ring 418 also moves downward with the piston rod 42 away from the seal retainer 402 thereby opening the second passage 416. Travel of the frictional slip ring 418 is terminated upon the contact with the sleeve bushing 409. As the piston rod 42 continues to move downward, the slip ring 418 remains stationary. When the piston rod 42 moves upward, the sklip ring 418 frictionally rides upward on the piston rod 42 until contact with retainer 402 is made. The slip ring 418 then remains stationary against retainer 402 thereby sealing off passage 416 between cavity 404 and cavity 414 during further upward motion of rod 42.

During downward travel of piston rod 42, there is a higher pressure within working chamber 32 than in reservoir 64. Accordingly, the hydraulic fluid is transmitted through the passage 424 to the underside of the valve disk 430. The hydraulic fluid in reservoir 64 in addition to the spring force is felt on the upper side of the O-ring 434. The pressure of the hydraulic fluid in the reservoir 64 is transmitted through the reservoir 64, the first passage 406, the first annular cavity 404, through the second passage 416 to the second cavity 414, through the first orifice 426 to the third cavity 422 and the O-ring 434. This path generates a pressure differential across the O-ring 434 and permits the valve disk 430 to lift, compressing the spring 432, and allowing the hydraulic fluid to pass into the reservoir 64 through the second orifice 428 in the sleeve 420.

During the rebound, the piston rod 42 is moved in an upward direction. The upward movement carries the slip ring 418 upward into contact with seal retainer 402, thus closing the second passage 416. This isolates the path between the reservoir 64 and the upper side of O-ring 434. Therefore, the hydraulic fluid above the O-ring 434 in third cavity 422 is at the same pressure as the hydraulic fluid in the working chamber 32 beneath the rod guide 408. Due to the fact that the area above the O-ring 434 is greater than the area beneath the annular disk 430 and due to the spring force provided by the helical spring 432, the annular valve disk 430 maintains the passage 424 closed, thus preventing flow through the orifice 428. Accordingly, the hydraulic fluid above the piston 34 in upper portion 38 of the chamber 32 is forced through the orifices 62 in the piston 34 causing the appropriate rebound force.

The shock absorber 10 also comprises an annular cup-shaped reservoir 450 which is positioned around the rod guide 408 outside and adjacent to the orifice 428. The reservoir 450 prevents the shock absorber 10 from working into freestroke which can happen in certain conditions.

The reservoir 450 comprises a radial portion 452 which joins with the lower section 412 at the end of pressure tube 30 and an axially extending sleeve portion 454 forming an upwardly open cup around sleeve 420. During the compression stroke, hydraulic fluid passes through the orifice 428 into the reservoir 450, over the top of the sleeve portion 454 into the reservoir 64. During the rebound stroke, air is prevented from passing through the orifice 428 during any occurrence of freestroke by the fluid quantity that builds up and remains in the reservoir 450.

Thus, during the compression stroke, excess hydraulic fluid is forced out of the upper portion 36 of the chamber 32 into the reservoir 64 via the passage 424, past the annular disk 430, through the orifice 428 and through the reservoir 450 into the upper portion of the reservoir 64. On the rebound stroke, the piston rod volume is replaced by hydraulic fluid flowing through the base valve 63 into lower portion 36. In this manner, hydraulic fluid is once again cycled in one direction through reservoir 64, i.e., from top to bottom.

Figure 8:
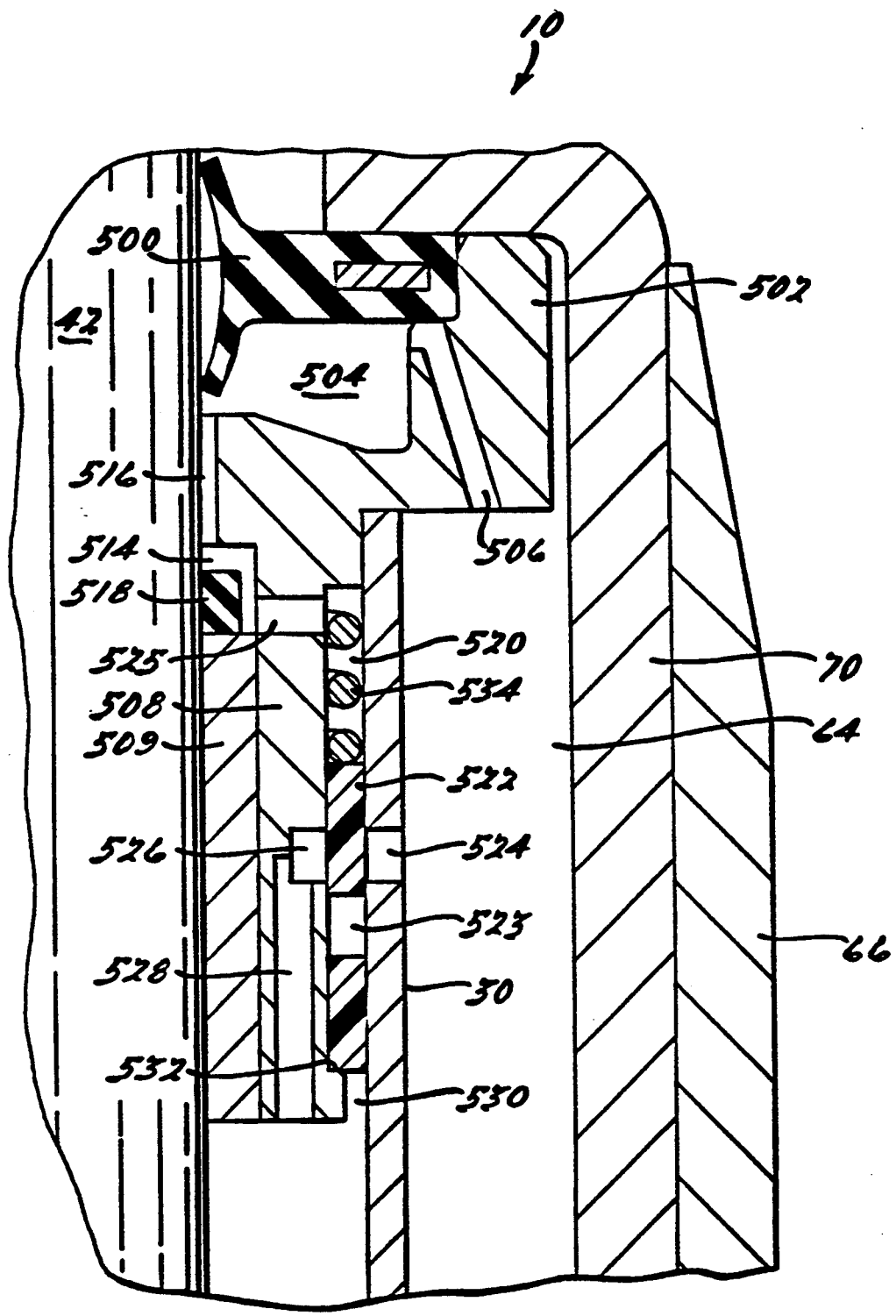
FIG. 8 is a fifth embodiment of the present invention.

Referring now to FIG. 3 and to the enlarged portion of the shock absorber 10 shown in FIG. 8, a control valve arrangement according to a fifth preferred embodiment of the present invention is shown. This embodiment uses fewer parts than those previously described. At the upper end of the pressure tube 30 and adjacent to the periphery of the piston rod 42, inside upper end cap 70, a rubber or plastic annular seal 500 is produced. The seal 500 is disposed inside the upper end cap 70 and prevents dirt and foreign matter from entering the working interior of the shock absorber 10. The seal 500 is retained in position by a seal retainer 502 and the end cap 70 and forms one side of a first annular cavity 504 between the seal retainer 502, the piston rod 42 and the seal 500. A flow passage 506 is disposed between the annular cavity 504 and the reservoir 64 in the seal retainer 502. The seal retainer 502 has a downwardly extending sleeve portion forming a rod guide 508 disposed adjacent to the periphery of the piston rod 42. The seal retainer 502 is fitted into the pressure tube 30. The rod guide 508 provides radial support to the piston rod 42 allowing axial movement of the piston rod 42 within pressure tube 30.

Positioned between the piston rod 42 and the rod guide 508 is a plastic sleeve bushing 509. The sleeve bushing 509 prevents wear of the rod guide 508 and reduces the friction against rod 42. The upper end of the bushing 509, the piston rod 42, and the seal retainer 502 form a second cavity 514. A second flow passage 516 in the seal retainer 502 adjacent piston rod 42 allows fluid communication between the cavity 504 and the cavity 514.

Positioned within the annular cavity 514 and around the piston rod 42 is a frictional slip ring 518. The slip ring 518 moves between contact with the seal retainer 502 when piston rod 42 moves in an upward direction, and contact with the sleeve bushing 509 when the piston rod 42 moves in a downward direction. As the piston rod 42 continues upward or downward travel, the slip ring 518 remains in contact with either the seal retainer 502 or the sleeve bushing 509, respectively.

As can be seen in FIG. 8, when the piston rod 42 moves in an upward direction, the slip ring 518 moves into contact with seal retainer 502 thereby sealing off the passage 516. Further upward movement of the piston rod 42 continues to maintain the slip ring 518 in sealing engagement with the seal retainer 502. When piston rod 42 is moved downward, the slip ring 518 moves in a direction away from the seal retainer 502 thus opening the passage 516 from the first cavity 504 through the seal retainer 502 to the second cavity 514.

The pressure cylinder 30 and the rod guide 508 form a third cavity 520 therebetween. Disposed within the cavity 520 is a teflon valve sleeve 522 having a bore 523 therethrough. Disposed in the rod guide 508 between the cavity 520 and the cavity 514 is passage 525. The pressure cylinder 30 has an orifice 524 through its upper end adjacent and in alignment with a radial bore 526 in rod guide 508. An axially aligned bore 528 in the rod guide 508 communicates between the bore 526 and the upper portion 38 of working chamber 32. The rod guide 508 is spaced radially inward from the pressure cylinder 30 by a narrow annular gap 530 which the valve sleeve 522 closes. The valve sleeve 522 is retained within the cavity 520 by contact with the annular shoulder 532 on the lower outer end of the rod guide 508. The valve sleeve 522 is biased downward against shoulder 532 by a helical coil spring 534 which is disposed within cavity 520.

Operation of this embodiment is similar to the other embodiments except that during the compression stroke, the valve sleeve 522 is pushed upward against spring pressure exerted by the spring 534 until the bore 523 is aligned with the orifice 524 until the bore 523 is aligned with the orifice 524 and the bore 526 so as to pass fluid from the chamber 32 through the bore 528, the bore 526, the bore 523, and the orifice 524 into the reservoir 64.

As in the other embodiments shown and above described, during the rebound stroke, the passage 516 is sealed by the slip ring 518 and therefore the bore 526 remains sealed. Thus, once again hydraulic fluid is cycled in only one direction through the reservoir 64. This embodiment, however, utilizes only 6 components to form the control valve. It is simpler to construct and is more economical than the comparable embodiment shown in FIG. 7 which has 9 components comprising the control valve.

Figure 9:
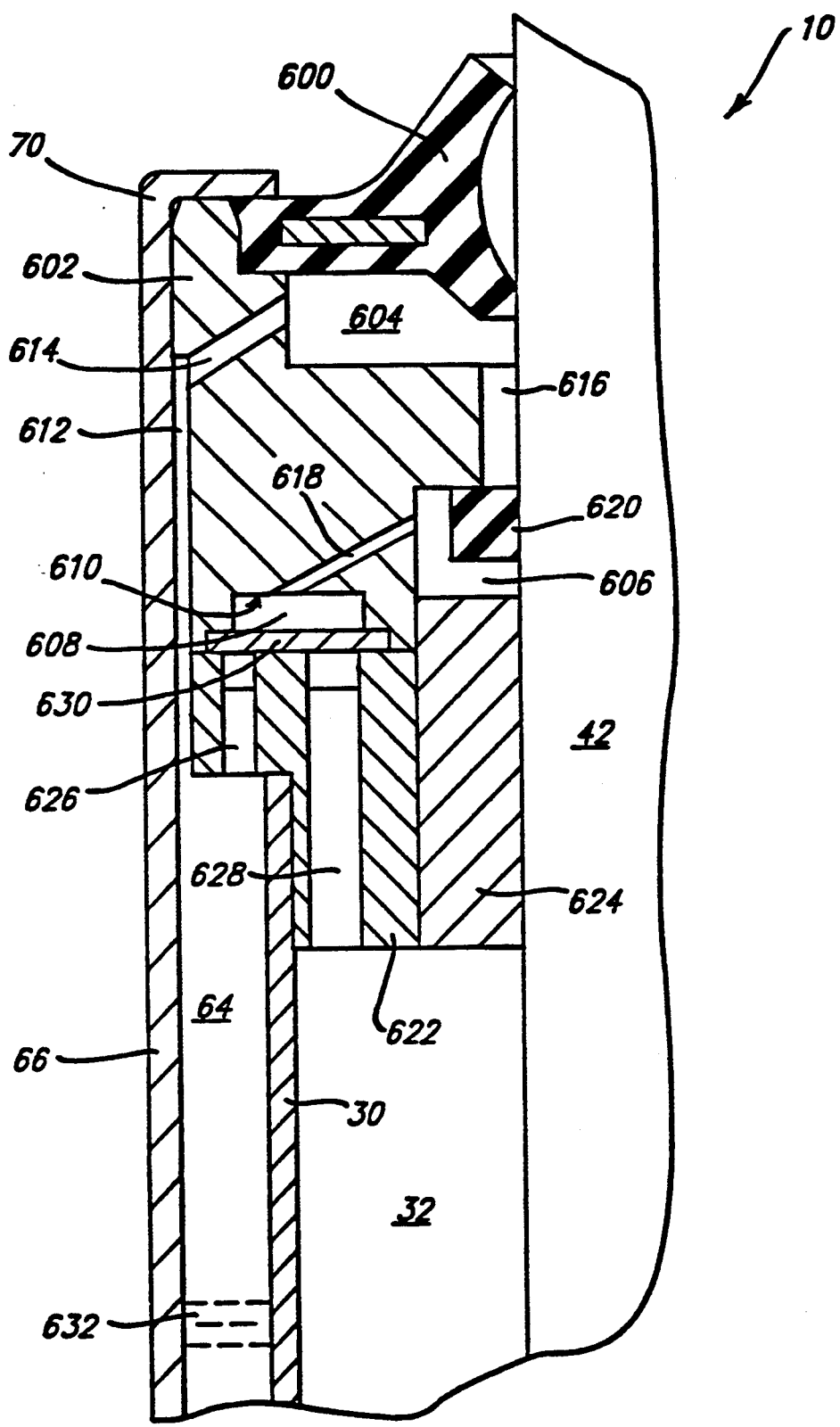
FIG. 9 is a sixth embodiment of the present invention.

Referring now to FIG. 9, a control valve arrangement according to the sixth preferred embodiment of the present invention is shown. At the upper end of the pressure tube 30 and adjacent to the periphery of the piston rod 42, a rubber or plastic annular seal 600 is provided. The seal 600 is disposed inside the upper end cap portion 70 of the reservoir tube 66 and prevents dirt and foreign matter from entering the working interior of the shock absorber 10. The seal 600 is retained in position by a seal retainer 602 and the end cap portion 70.

The shock absorber 10 includes three annular cavities 604, 606 and 608. The first annular cavity 604 is disposed between the seal retainer 602, the piston rod 42 and the seal 600. The second annular cavity 606 is formed between the piston rod 42 and the seal retainer 602 by means of a radially displaced surface region of the seal retainer 602. Finally, the third annular cavity 608 is formed by an annular groove located on the lower surface 610 of the seal retainer 602.

To allow the first annular cavity 604 to fluidly communicate with the annular fluid reservoir 64, the shock absorber 10 further has a first flow passage 612 and a second flow passage 614. The first flow passage 612 extends upwardly from the annular fluid reservoir 64 and between the reservoir tube 66 and the seal retainer 602. The second flow passage 614 extends radially outward and angularly downward in the seal retainer 602 form the first annular cavity 604 to the first flow passage 612.

To allow the second and third annular cavities 606 and 608 to fluidly communicate with the first annular cavity 604, the shock absorber 10 has a third and fourth flow passages 161 and 618. The thrif flow passage 616 extends between the first annular cavity 604 and the second annular cavity 606 and is disposed between the piston rod 42 and the seal retainer 602. The fourth flow passage 618 extends radially outward and downwardly in the seal retainer 602 from the second annular cavity 606 to the third annular cavity 608.

To control the flow of damping fluid through the third flow passage 616, an annular seal 620 is provided. The annular seal 620 is slidably disposed on the piston rod 42 in the second annular cavity 606. When the piston rod 42 is moving in an upward direction during rebound, the annular seal 620 moves upward until the seal interferes with the seal retainer 602 and prevents further upward movement of the annular seal 620. When the annular seal 620 interferes with the seal retainer 602, the annular seal 620 prevents damping fluid from flowing through the third flow passage 616. When the piston rod 42 is moving in a downward direction, the annular seal 620 also moves in a downward direction until the annular seal 620 interferes with a sleeve bushing described below which is secured to the rod guide 622. Because the annular seal 620 is displaced from the third flow passage 616 upon downward movement of the piston rod 42, the pressure of the damping fluid contained in the annular fluid reservoir 64 is allowed to fluidly communicate with the third flow passage 616.

The shock absorber 10 further comprises a sleeve bushing 624 which is disposed between the piston rod 42 and the rod guide 622. The sleeve bushing 624 is secured to the rod guide 622 and allows for vertical movement of the piston rod 42. Because the sleeve bushing 624 reduces the friction associated with movement of the piston rod 42, the sleeve bushing 624 is able to reduce wear of the piston rod 42 which would otherwise occur.

To allow damping fluid to flow between the upper portion of the working chamber 32 and the annular fluid reservoir 64, the shock absorber 10 further comprises a fifth flow passage 626 and a sixth flow passage 628. The fifth flow passage 626 extends vertically upward in the annular rod guide 622 from the annular fluid reservoir 64, while the sixth flow passage 628 extends upward in the annular rod guide 622 from the upper portion of the working chamber 32. To control the flow of damping fluid between the fifth and sixth flow passages 626 and 628, a deflectable valve member 630 is provided. The valve member 630, defining a membrane, is disposed between the seal retainer 602 and the rod guide 622 so as to prevent the flow of damping fluid between the third annular cavity 608 and the fifth and sixth flow passages 626 and 628. The membrane 630 is made of a suitable material which can be deformed when the pressure of damping fluid flowing through the fifth and sixth flow passages 626 and 628 is greater than the pressure of damping fluid in the third annular cavity 608. While the membrane 630 may be made from rubber, it is to be understood that other suitable materials may be used.

To filter the damping fluid flowing through the reservoir tube 66 and the pressure cylinder 30, a filter 632 is provided. The filter 632 is disposed between the reservoir tube 66 and the pressure cylinder 30. Since the damping fluid in the annular fluid reservoir 64 passes through the reservoir tube 66 inone direction, the damping fluid will flow through the filter 632 which removes impurities which may otherwise eventually interfere with the operation of the shock absorber 10. The filter 632 is made from a material, or composition of materials having the desired permeability characteristic and which is compatible with hydraulic fluid.

The operation of the shock absorber 10 shown in FIG. 9 will now be described. During compression, the seal 620 moves in a downward direction so as to allow damping fluid to flow through the third flow passage 616. Damping fluid is therefore able to flow from the annular fluid reservoir 64 to the third annular cavity 608 by means of the first flow passage 612, the second flow passage 614, the first annular cavity 604, the third flow passage 616, the second annular cavity 606 and the fourth flow passage 618. Accordingly, the pressure inside the third annular cavity 608 is substantially equal to the pressure of the damping fluid within the annular fluid reservoir 64 during compression.

Since during compression the pressure of damping fluid in the upper portion of the working chamber 32 is greater than the pressure of the damping fluid in the annular fluid reservoir 64, the membrane 630 flexes in an upward direction due to the pressure differential between the damping fluid in the third annular cavity 608 and the damping fluid in the upper portion of the working chamber 32. Because the membrane 630 flexes in this manner, damping fluid is able to flow from the upper portion of the owrking chamber 32 to the annular fluid reservoir 64 through the fifth flow passage 626 and the sixth flow passage 628.

During rebound of the shock absorber 10 when the piston rod 42 is moving in an upward direction, the annular seal 620 is displaced upwardly until the annular seal 620 interferes with the seal retainer 602. When the annular seal 620 interferes with the seal retainer 602, the seal 620 prevents damping fluid from flowing through the third flow passage 616. Accordingly, the pressure of damping fluid within the third annular cavity 608 remains substantially the same pressure as the damping fluid in the annular fluid reservoir 64 when upward movement of the piston rod 42 began. Because the working area of the membrane 630 which is exposed to damping fluid in the third annular cavity 608 is greater than the working area exposed to the damping fluid in the sixth flow passage 628, the membrane 630 does not flex even though the pressure of the damping fluid in the upper portion of the working chamber 32 may be greater than the damping fluid in the third annular cavity 608. Because the membrane 630 does not flex, the membrane 630 is able to prevent the flow of damping fluid between the upper portion of the working chamber 32 and the annular fluid reservoir 64 through the fifth and sixth flow passages 626 and 628. Accordingly, the damping fluid which enters the working chamber 32 from the annular fluid reservoir 64 during rebound only flows through the base valve (not shown).

Because the membrane 630 allows damping fluid to flow from the upper portion of the working chamber 32 into the annular fluid reservoir 64 through the fifth and sixth flow passages 626 and 628 during compression, yet prevents damping fluid from flowing from the upper portion of the working chamber 32 to the annular fluid reservoir 64 during rebound, damping fluid flows primarily in a downward direction through the reservoir tube 66 during operation of the shock absorber 10. Because the damping fluid moves in primarily one direction through the reservoir tube 66, the filter 632 is able to remove impurities which would otherwise interfere with the operation of the shock absorber 10. In addition, because the flow of damping fluid moves primarily in one direction through the reservoir tube 66, the shock absorber 10 is able to dissipate a greater amount of heat than would otherwise be possible.

Figure 10:
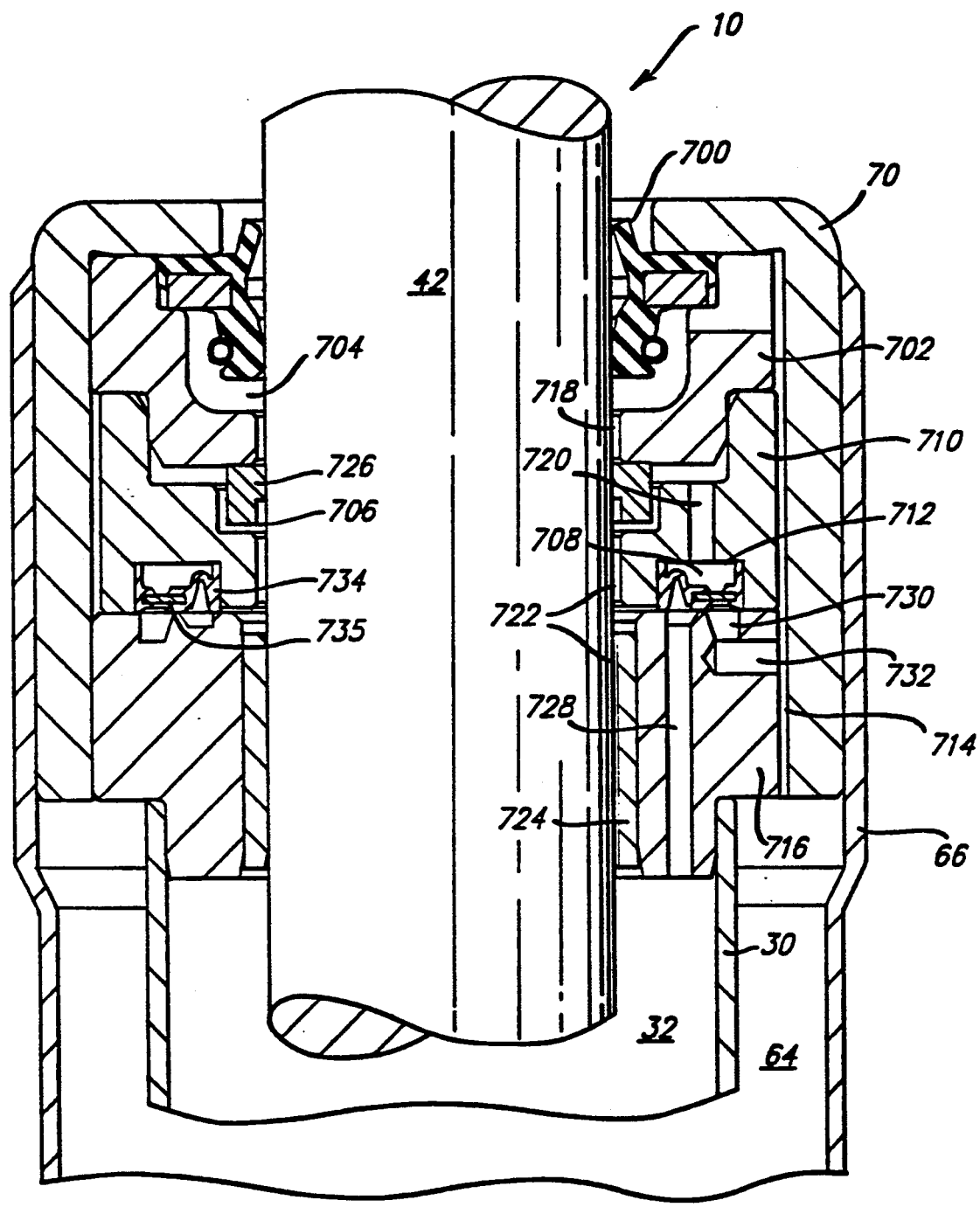
FIG. 10 is a seventh embodiment of the present invention.

Referring now to FIG. 10, a control valve arrangement according to the seventh preferred embodiment of the present invention is shown. At the upper end of the pressure tube 30 and adjacent to the periphery of the piston rod 42, a rubber or plastic annular seal 700 is provided. The seal 700 is disposed inside the upper end cap 70 within the reservoir tube 66 and prevents dirt and foreign matter from entering the working interior of the shock absorber 10. The seal 700 is retained in position by a seal retainer 702 and the end cap 70.

The shock absorber 10 includes three annular cavities 704, 706 and 708. The first annular cavity 704 is disposed between the seal retainer 702, the piston rod 42 and the seal 700. The second annular cavity 706 is formed between the piston rod 42, the seal retainer 702 and the valve housing 710 by means of radially displaced surface regions of the valve housing 710. Finally, the third annular cavity 708 is formed by an annular groove located on the lower surface 712 of the valve housing 710.

To allow the first annular cavity 704 to fluidly communicate with the annular fluid reservoir 64, the shock absorber 10 further has a first flow passage 714. The first flow passage 714 extends upwardly from the annular fluid reservoir 64 between the end cap 70 and the rod guide 716, valve housing 710 and seal retainer 702.

To allow the second and third annular cavities 706 and 708 to fluidly communicate with the first annular cavity 704, the shock absorber 10 has second and third flow passages 718 and 720. The second flow passage 718 extends between the first annular cavity 704 and the second annular cavity 706 and is disposed between the piston rod 42 and the seal retainer 702. The third flow passage 720 extends downwardly in the valve housing 710 from the second annular cavity 706 to the third annular cavity 708.

To allow the second annular cavity 706 to fluidly communicate with the upper portion 38 of working chamber 32, the shock absorber 10 further has a fourth flow passage 722. The fourth flow passage 722 extends upwardly from the working chamber 32 between the piston rod 42 and the inside diameter of a sleeve bushing 724 and the valve housing 710.

To control the flow of damping fluid through the second flow passage 718, an annular seal 726 is provided. The annular seal 726 is slidably disposed on the piston rod 42 in the second annular cavity 706. When the piston rod 42 is moving in an upward direction during rebound, the annular seal 726 moves upward until the seal interferes with the seal retainer 702 and prevents further upward movement of the annular seal 726. When the annular seal 726 interferes with the seal retainer 702, the annular seal 726 prevents damping fluid from flowing through the second flow passage 718. When the piston rod 42 is moving in a downward direction, the annular seal 726 also moves in a downward direction until the annular seal 726 interferes with the valve housing 710. Because the annular seal 726 is displaced from the second flow passage 718 upon downward movement of the piston rod 42, the pressure of the damping fluid contained in reservoir 64 is allowed to fluidly communicate with the third annular cavity 708 via third flow passage 720, second annular cavity 706, second flow passage 718, first annular cavity 704 and first flow passage 714.

The shock absorber 10 includes a sleeve bushing 724 which is disposed between the piston rod 42 and the rod guide 716. The sleeve bushing 724 is secured to the rod guide 716 and allows for vertical movement of the piston rod 42. Because the sleeve bushing 724 reduces the friction associated with movement of the piston rod 42, the sleeve bushing 724 is able to reduce wear of the piston rod 42 which would otherwise occur.

To allow damping fluid to flow between the upper portion of the working chamber 32 and the annular fluid reservoir 64, the shock absorber 10 further comprises a fifth flow passage 728 and a sixth flow passage 730. The fifth flow passage 728 extends vertically upward in the annular rod guide 716 from the working chamber 32, while the sixth flow passage 730 extends downwardly from the top surface of the annular rod guide 716 and fluidly communicates with an inwardly extending bore 732 provided at the outer periphery of rod guide 716. Bore 732 fluidly communicates with first flow passage 714 so as to permit flow between working chamber 32 and the annular fluid reservoir 64.

To control the flow of damping fluid between the fifth and sixth flow passages 728 and 730, a flexible valve member 734 is provided. The valve member 734 is disposed within the third annular cavity 708 so as to control the flow of damping fluid between the third annular cavity 708 and the fifth and sixth flow passages 728 and 730. The flexible valve member 734 is made of a suitable material which can be compliantly deformed when the pressure of damping fluid flowing through the fifth and sixth flow passages 728 and 730 is greater than the pressure of damping fluid in the third annular cavity 708. The valve member 734 preferably is fabricated from rubber and includes a metallic disc member 735 integrally associated therewith to provide additional stability and stiffness.

The operation of the shock absorber 10 shown in FIG. 10 will now be described. During compression, the seal 726 moves in a downward direction so as to prevent damping fluid from flowing through the fourth flow passage 722 and into the second annular cavity 706. The pressure of the damping fluid is therefore able to fluidly communicate from the annular fluid reservoir 64 to the third annular cavity 708 by means of the first flow passage 714, the first annular cavity 704, the second flow passage 718, the second annular cavity 706 and the third flow passage 720. Accordingly, the pressure inside the third annular cavity 708 is substantially equal to the pressure of the damping fluid within the annular fluid reservoir 64 during compression.

Since during compression the pressure of damping fluid in the upper portion of the working chamber 32 is greater than the pressure of the damping fluid in the annular fluid reservoir 64, the valve member 734 flexes in an upward direction due to the pressure differential between the damping fluid in the third annular cavity 708 and the damping fluid in the upper portion of the working chamber 32. Because the valve member 734 flexes in this manner, damping fluid is able to flow from the upper portion of the working chamber 32 to the annular fluid reservoir 64 through the fifth flow passage 728, the sixth flow passage 730 and first flow passage 714.

During rebound of the shock absorber 10 when the piston rod 42 is moving in an upward direction, the annular seal 726 is displaced upwardly until the annular seal 726 interferes with the seal retainer 702. When the annular seal 726 interferes with the seal retainer 702, the seal 726 prevents damping fluid from flowing through the second flow passage 718. Additionally, when the annular seal 726 is in this position, fluid is permitted to flow from working chamber 32 through fourth flow passage 722, second annular cavity 706 and third flow passage 720 into third annular cavity 708. Accordingly, the pressure of damping fluid within the third annular cavity 708 remains substantially the same pressure as the damping fluid in the working chamber 32 when upward movement of the piston rod 42 began. Because the working area of the valve member 734 which is exposed to damping fluid in the third annular cavity 708 is greater than the working area exposed to the damping fluid in the fifth flow passage 728, the valve member 734 does not flex. Because the valve member 734 does not flex, the valve member 734 is able to prevent the flow of damping fluid between the upper portion of the working chamber 32 and the annular fluid reservoir 64 through the fifth and sixth flow passages 728 and 730. Accordingly, the damping fluid which enters the working chamber 32 from the annular fluid reservoir 64 during rebound only flows through the base valve (not shown).

Because the valve member 734 allows damping fluid to flow from the upper portion of the working chamber 32 into the annular fluid reservoir 64 through the fifth and sixth flow passages 728 and 730 during compression, yet prevents damping fluid from flowing from the upper portion of the working chamber 32 to the annular fluid reservoir 64 during rebound, damping fluid flows primarily in a downward direction through the reservoir tube 66 during operation of the shock absorber 10. Because the flow of damping fluid moves primarily in one direction through the reservoir tube 66, the shock absorber 10 is able to dissipate a greater amount of heat than would otherwise be possible.

Figure 11:
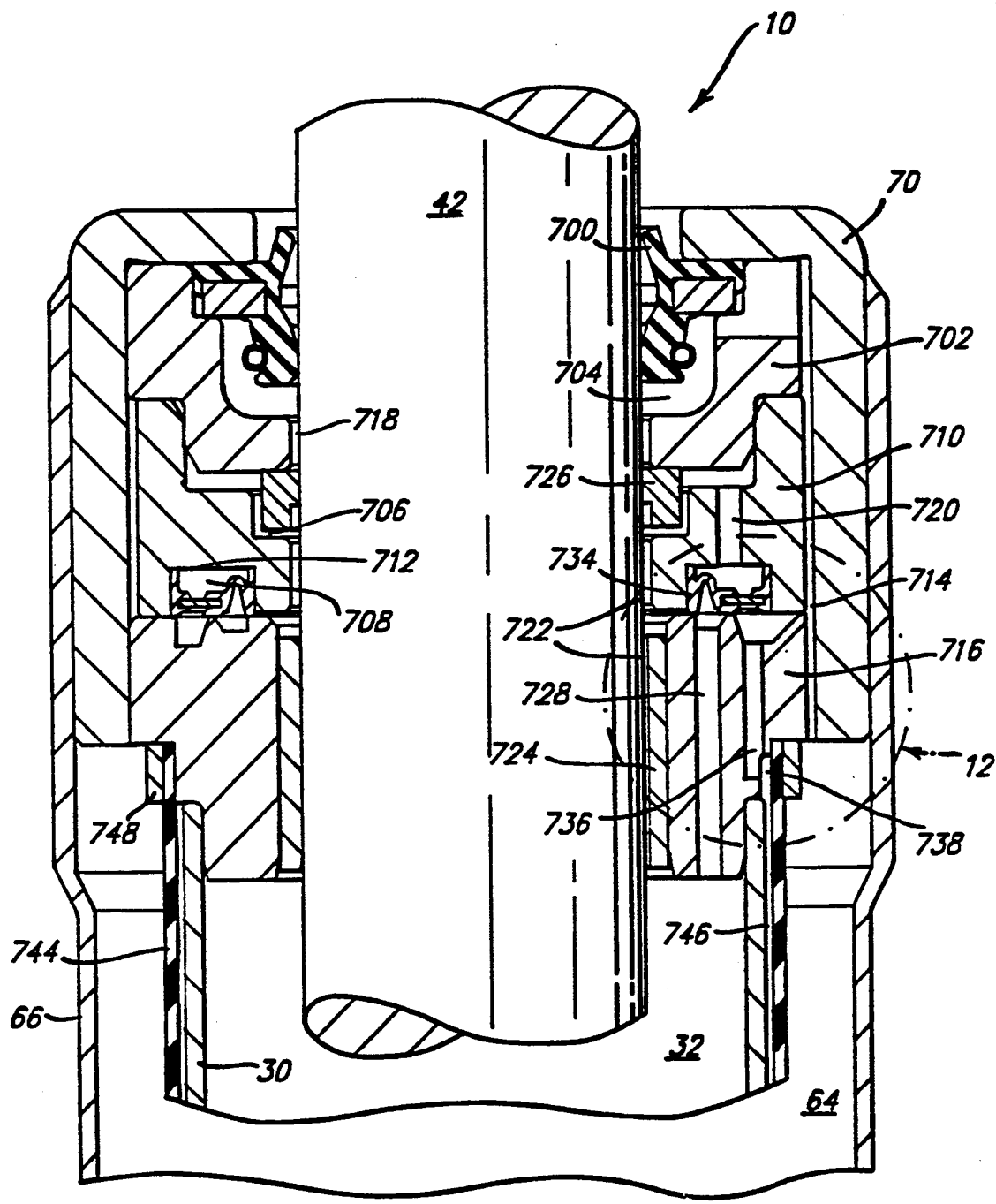
FIGS. 11 and 12 are an eight embodiment of the present invention.
Figure 12:
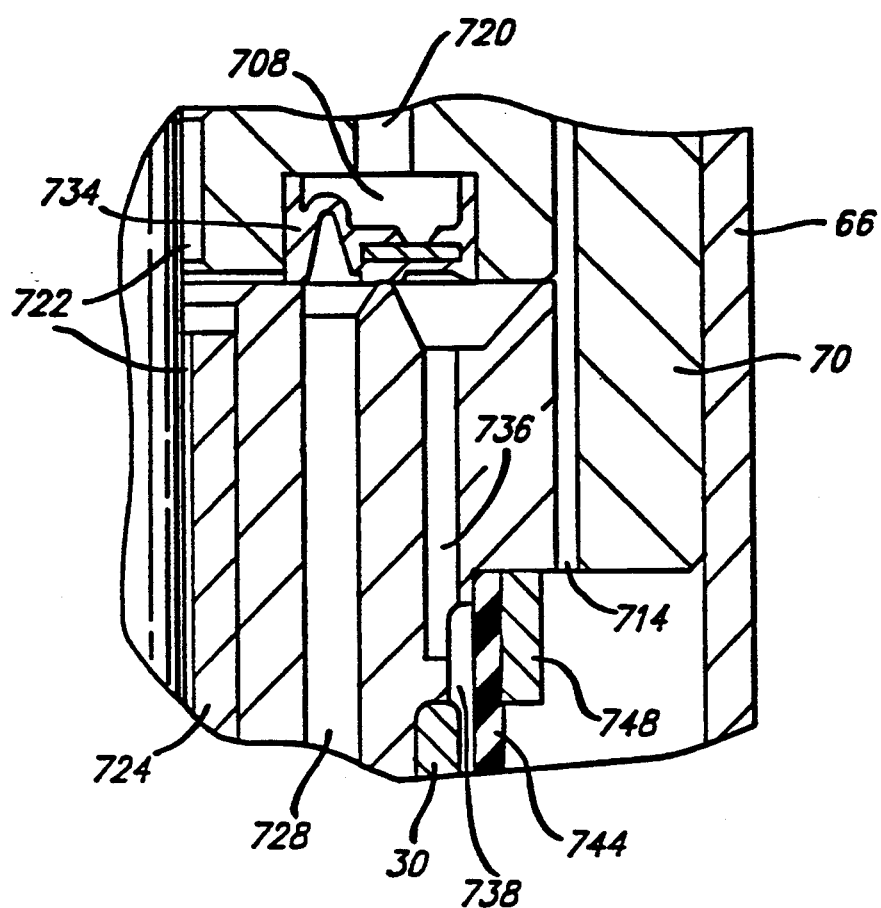

Referring now to FIGS. 11 and 12, a control valve arrangement according to the eighth preferred embodiment of the present invention is shown. The eighth preferred embodiment of the present invention is similar to that of the seventh preferred embodiment. However, the rod guide 716 further has a plurality of flow passages 736, as well as a plurality of slots 738. The flow passage 736 extends axially from the sixth flow passage 730 to the slots 738. The slots 738 are semi-elliptical in shape and are disposed on the lower radially outward surface of the rod guide 716 immediately above the pressure cylinder tube.

To reduce aeration of the damping fluid flowing through the flow passages 736, a rubber sleeve 744 is provided. The rubber sleeve 744 extends circumferentially around the pressure cylinder 30 and extends downwardly from the rod guide 716 to a position approximately one inch below the level of damping fluid stored in the annular fluid reservoir 64. A flow passage 746 is formed between the radially outward surface of the pressure cylinder 30 and the radially inward surface of the rubber sleeve 744 so as to permit damping fluid from the sixth flow passage 730 to flow to the annular fluid reservoir 36 through the flow passage 736 as well as the flow passage 746. By allowing damping fluid to flow in this manner, aeration of the damping fluid flowing into the annular fluid reservoir 64 is reduced. Furthermore, because the sleeve 744 is formed from rubber, the sleeve 744 can expand to increase the size of the flow passage 746 when the shock absorber 10 is damping extreme shock.

To secure the rubber sleeve 744 against the rod guide 716, an annular crimp ring 748 is provided. The annular crimp ring 748 is disposed on the radially outer periphery of the rubber sleeve 744 at its upper surface. Because the crimp ring 748 exerts a compressive force against the rubber sleeve 744, the crimp ring 748 is able to secure the rubber sleeve 744 against the rod guide 716.

It is apparent that the preferred embodiments illustrated and described above are well calculated to fill the objects stated. For example, damping fluid is not required to flow through the base valve during compression so that damping during compression may be substantially fully controlled by the piston. Accordingly, the present invention may be used in conjunction with adjustable damping suspension systems to increase the range of damping such systems can provide. It will be appreciated, however, that the present invention is susceptible to modification, variation and change. For example, the present invention may be used for shock absorbers which dampen the movement of truck cabs, seats and other articles. It is therefore to be understood that within the scope of the appended claims, the invention may be practiced otherwise than as specifically described.

What is claimed is:

1. A shock absorber comprising:
   a pressure tube symmetrically disposed about an axis, said pressure tube forming a working chamber having upper and lower portions;
   a fluid reservoir tube for storing hydraulic fluid, said reservoir tube disposed concentric to and radially extended from said pressure tube and having a closed end and an open end;
   first valve means for allowing the flow of hydraulic fluid from said upper portion of said working chamber into said reservoir and for preventing flow of fluid from said reservoir tube into said upper portion of said working chamber through said first valve means, said first valve means disposed between said upper portion of said working chamber and said reservoir tube;
   second valve means for allowing flow of said hydraulic fluid from said reservoir tube into said lower portion of said working chamber and for preventing flow of said fluid from said lower portion into said reservoir tube through said second valve means, said second valve means being disposed between said lower portion of said working chamber and said reservoir tube;
   a piston slidably disposed between and separating said upper and lower portions of said working chamber, said piston allowing restricted flow of hydraulic fluid between said upper and lower portions of said working chamber;
   an elongated piston rod having first and second ends, said first end being attached to said piston, said second end of said elongated piston rod extending along the axis of said pressure tube through said upper portion of said working chamber and out one end of said pressure tube;
   a rod guide between said piston rod and said pressure tube at an end of said pressure tube;
   an annular seal around said piston rod;
   an annular seal retainer disposed concentrically about said piston rod and axially against said rod guide, said seal retainer and said seal closing said open end of said reserve tube and forming a first annular cavity between said piston rod, said seal, and said seal retainer, said seal retainer having a first and second flow passage therethrough;
   an upper annular sleeve section disposed on said guide rod having a radial passage therethrough, said upper annular sleeve section spaced radially outward from said piston rod and abutting said seal retainer so as to form a second annular cavity adjacent said piston rod;
   a slip ring frictionally mounted to said piston rod within said second cavity; and
   a tubular sleeve member concentric to said rod guide and spaced radially outward from said upper annular sleeve section of said rod guide, said tubular sleeve member having a first end abutting said rod guide and a second end abutting said seal retainer to thereby form a third annular cavity.

2. A direct acting shock absorber for damping the movement of the body of an automobile comprising:
   a pressure cylinder forming a working chamber having first and second portions operable to store damping fluid;
   a piston disposed within said pressure cylinder between said first and second portions of said working chamber;
   a fluid reservoir operable to store damping fluid;
   first valve means for permitting damping fluid to flow from said first portion of said working chamber to said fluid reservoir during movement of said piston in a first direction;
   second valve means for permitting damping fluid to flow from said fluid reservoir to said second portion of said working chamber during movement of said piston in a second direction;
   a rod guide having a first flow passage fluidly communicating with said first portion of said working chamber, said first flow passage selectively fluidly communicating with said reservoir through a first orifice in said rod guide; and
   a first valve disk, said first valve disk operable to control the flow of damping fluid from said first flow passage through said first orifice, an additional flow passage means in said rod guide in communication with said reservoir and said first valve disk such that the pressure of the hydraulic fluid in said additional flow passage means being operable to bias said valve disk in a first direction.

3. The shock absorber according to claim 2, wherein said rod guide additional flow passage means comprises:

a second flow passage fluidly communicating with said reservoir;

a first cavity fluidly communicating with said second flow passage;

a third flow passage fluidly communicating with said first cavity;

a second cavity selectively fluidly communicating with said third flow passage;

a second orifice fluidly communicating with said second cavity; and a third cavity fluidly communicating with said second orifice, the pressure of the hydraulic fluid in said third cavity operable to bias said valve disk in said first direction.

4. The shock absorber according to claim 3, wherein said first valve disk is biased in a first direction by the pressure difference between the damping fluid in said third cavity and the damping fluid in the first portion of said working chamber.

5. The shock absorber according to claim 4, wherein said first valve disk is further biased in said first direction by a spring, the biasing forces applied to said first valve disk by the damping fluid in said reservoir and by said spring operable to cause said first valve disk to prevent the flow of damping fluid through said first flow passage to said first orifice when said piston is displaced in said second direction, said biasing forces applied to said first valve disk operable to cause the flow of damping fluid from said first flow passage to said first orifice when said piston is moving in said first direction.

6. The shock absorber according to claim 5, further comprising a piston rod mechanically communicating with said piston and a slip ring, said slip ring being disposed on the periphery of said piston rod and being operable to prevent fluid communication between said third flow passage and said second cavity when said piston rod is displaced in said second direction.

7. The shock absorber according to claim 6, further comprising a second valve disk, said second valve disk having a surface area less than the surface area of said first valve disk, said second valve disk being disposed within said third cavity.

8. The shock absorber according to claim 7, further comprising an O-ring disposed between said first and second valve disks.

9. A method for controlling the flow of damping fluid between first and second portions of a working chamber of a direct acting shock absorber comprising the steps of:

permitting damping fluid in the first portion of said working chamber to fluidly communicate with first valve means for controlling the flow of damping fluid;

permitting damping fluid in the second portion of said working chamber to fluidly communicate with second valve means for controlling the flow of damping fluid;

permitting said first and second valve means to fluidly communicate with a reservoir of damping fluid;

allowing damping fluid in said reservoir to flow in one direction between said first valve means and said second valve means during compression and rebound of said shock absorber, and said shock absorber including a rod guide having a first flow passage fluidly communicating with said first portion of said working chamber, said first flow passage selectively fluidly communicating with said reservoir through a first orifice in said rod guide, said first valve means including a first valve disk, said first valve disk operable to control the flow of damping fluid from said first flow passage through said first orifice controlling opening of said first valve disk with an additional flow passage means in said rod guide in communication with said reservoir and said first valve disk such that the pressure of the damping fluid in said additional flow passage means being operable to bias said valve disk in a first direction.

10. The method of claim 9, wherein said rod guide comprises:

a second flow passage fluidly communicating with said reservoir;

a first cavity fluidly communicating with said second flow passage;

a third flow passage fluidly communicating with said first cavity;

a second cavity selectively fluidly communicating with said third flow passage;

a second orifice fluidly communicating with said second cavity; and a third cavity fluidly communicating with said second orifice, the pressure differential of the hydraulic fluid in said third cavity with respect to the hydraulic fluid in said first portion of said working chamber operable to bias said valve disk in said first direction.

11. The method of claim 10, wherein said first valve disk is biased in a first direction by the pressure difference between the damping fluid in said third cavity and the damping fluid in said first portion of said working chamber.

12. The method of claim 11, wherein said first valve disk is further biased in a first direction by a spring, the biasing forces applied to said first valve disk by the damping fluid in said reservoir and by said spring operable to cause said first valve disk to prevent the flow of damping fluid through said first flow passage to said first orifice when said piston is displaced in said second direction, said biasing forces applied to said first valve disk operable to cause the flow of damping fluid from said first flow passage to said first orifice when said piston is moving in said first direction.

13. The method of claim 12, wherein said shock absorber further comprises a piston rod mechanically communicating with said piston, said shock absorber further comprises a frictional slip ring disposed on the periphery of said piston rod, said slip ring operable to prevent fluid communication between said third flow passage and said second cavity when said piston rod is displaced in said second direction.

14. The method of claim 13, wherein said first valve means further comprises a second valve disk, said second valve disk having a surface area less than the surface area of said first valve disk, said second valve disk being disposed within said third cavity.

15. The method of claim 13, wherein said second valve means further comprises an O-ring disposed between said first and second valve disks.

16. A shock absorber comprising:

a pressure tube symmetrically disposed about an axis, said pressure tube forming a working chamber having upper and lower portions;

a reservoir tube for storing hydraulic fluid, said reservoir tube disposed concentric to and radially extended from said pressure tube;

a flexible valve member operable for controlling the flow of hydraulic fluid between said upper portion of said working chamber and said reservoir tube;

second valve means for allowing flow of said hydraulic fluid from said reservoir tube into said lower portion of said working chamber and for preventing flow of said fluid from said lower portion of said working chamber into said reservoir tube;

a piston slidably disposed between and separating said upper and lower portions of said working chamber, said piston allowing restricted flow of hydraulic fluid between said upper and lower portions of said working chamber;

an elongated piston rod having first and second ends, said first end being attached to said piston, said second end of said elongated piston rod extending along the axis of said pressure tube through said upper portion of said working chamber and out one end of said pressure tube;

a rod guide disposed between said piston rod and said pressure tube;

a first annular seal disposed around said piston rod;

an annular seal retainer disposed concentrically about said piston rod and adjacent to said rod guide;

a first annular cavity disposed between said piston rod, said first annular seal, and said seal retainer;

a second annular cavity disposed between said piston rod and said annular seal retainer;

a third annular cavity disposed between said annular seal retainer and said rod guide;

a first flow passage communicating with said reservoir tube;

a second flow passage communicating with said first annular cavity and said first flow passage;

a third flow passage communicating with said first annular cavity and said second annular cavity;

a fourth flow passage communicating with said second annular cavity and said third annular cavity;

a fifth flow passage communicating with said reservoir tube and said valve member;

a sixth flow passage communicating with the upper portion of said working chamber and said valve member; and a second annular seal disposed in said second annular cavity, said second annular seal operably to restrict movement of said flexible valve member during rebound of said shock absorber by controlling the flow of damping fluid between said third annular cavity and said reservoir tube.

17. A shock absorber comprising:

a pressure tube symmetrically disposed about an axis, said pressure tube forming a working chamber having upper and lower portions;

a reservoir tube for storing hydraulic fluid, said reservoir tube disposed concentric to and radially extended from said pressure tube;

a flexible valve member operable for controlling the flow of hydraulic fluid between said upper portion of said working chamber and said reservoir tube, said flexible valve member is defined as a deflectable membrane;

second valve means for allowing flow of said hydraulic fluid from said reservoir tube into said lower portion of said working chamber and for preventing flow of said fluid from said lower portion of said working chamber into said reservoir tube.

a piston slidably disposed between and separating said upper and lower portions of said working chamber, said piston allowing restricted flow of hydraulic fluid between said upper and lower portions of said working chamber; and an elongated piston rod having first and second ends, said first end being attached to said piston, said second end of said elongated piston rod extending along the axis of said pressure tube through said upper portion of said working chamber and out one end of said pressure tube.

18. The shock absorber according to claim 13 wherein said deflectable membrane is disposed between said seal retainer and said rod guide adjacent said third annular cavity, said deflectable membrane controls the flow of damping fluid between said third annular cavity and said fifth and sixth flow passages such that said membrane is deflectably deformed when the pressure of damping fluid flowing through said fifth and sixth flow passages is greater than the fluid pressure in said third annular cavity.

* * * * *

UNITED STATES PATENT AND TRADEMARK OFFICE
CERTIFICATE OF CORRECTION

PATENT NO. : 5,363,945

DATED : Nov. 15, 1994

INVENTOR(S) : Magnus B. Lizell & Bert Vanroye

Page 1 of 2

It is certified that error appears in the above-indentified patent and that said Letters Patent is hereby corrected as shown below:

On title page, Inventors: Bert Vanroye, after "Borgloon," insert --Belguim--;

Col. 3 Line 13, "eight" should be --eighth--;

Col. 3, Line 60, "teflon" should be --Teflon®--;

Col. 3, Line 62, "teflon" should be --Teflon®--;

Col. 8, Line 14, "busing" should be --bushing--;

Col. 9, Line 2, "220" should be --210--;

Col. 11, Line 35, "sklip" should be --slip--;

Col. 13, Line 18, "teflon" should be --Teflon®--;

Col. 13, Line 38-39, delete "until the bore 523 is aligned with the orifice 524";

UNITED STATES PATENT AND TRADEMARK OFFICE
CERTIFICATE OF CORRECTION

PATENT NO. : 5,363,945
DATED : Nov. 15, 1994
INVENTOR(S) : Magnus B. Lizell & Bert Vanroye It is certified that error appears in the above-indentified patent and that said Letters Patent is hereby corrected as shown below:

Col. 14, Line 13, "form" should be --from--;

Col. 14, Line 17, delete "a";

Col. 14, Line 18, "161" should be --616--;

Col. 14, Line 18, "thrif" should be --third--;

Col. 15, Line 15, "inone" should be --in one--;

Col. 15, Line 44, "owrking" should be --working--;

Col. 22, Line 62, Claim 15, "claim 13" should be --claim 14--;

Col. 24, Line 5, Claim 16, "operably" should be --operable--;

Col. 24, Line 26, Claim 17, "tube." should be --tube;--and

Col. 24, Line 38, Claim 18, "claim 13" should be --claim 17--.

Signed and Sealed this

Twenty-third Day of May, 1995

Attest:

BRUCE LEHMAN

Attesting Officer       Commissioner of Patents and Trademarks